US012585019B2

(12) United States Patent
Embry et al.

(10) Patent No.: US 12,585,019 B2
(45) Date of Patent: Mar. 24, 2026

(54) SYSTEMS AND METHODS FOR MONITORING UNDERWATER STRUCTURES

(71) Applicant: 3D at Depth, Inc., Longmont, CO (US)

(72) Inventors: Carl W. Embry, Boulder, CO (US);
Brett Nickerson, Golden, CO (US);
Neil Manning, Katy, TX (US)

(73) Assignee: 3D at Depth, Inc., Longmont, CO (US)

( * ) Notice: Subject to any disclaimer, the term of this patent is extended or adjusted under 35 U.S.C. 154(b) by 0 days.

(21) Appl. No.: 18/680,060

(22) Filed: May 31, 2024

(65) Prior Publication Data

US 2024/0319370 A1 Sep. 26, 2024

Related U.S. Application Data

(63) Continuation of application No. 17/569,685, filed on Jan. 6, 2022, now Pat. No. 12,019,159, which is a
(Continued)

(51) Int. Cl.
*G06F 11/30* (2006.01)
*G01K 13/02* (2021.01)
(Continued)

(52) U.S. Cl.
CPC .............. *G01S 17/89* (2013.01); *G01K 13/02* (2013.01); *G01M 3/04* (2013.01); *G01M 3/20* (2013.01);
(Continued)

(58) Field of Classification Search
CPC ................................. G01S 17/89; G01S 17/50
See application file for complete search history.

(56) References Cited

U.S. PATENT DOCUMENTS

| | | |
|---|---|---|
| 4,123,160 A | 10/1978 | Caputo et al. |
| 4,643,867 A | 2/1987 | Hornak et al. |

(Continued)

FOREIGN PATENT DOCUMENTS

| | | |
|---|---|---|
| AU | 2018300057 | 2/2020 |
| BR | 11-2020-000375 | 7/2020 |

(Continued)

OTHER PUBLICATIONS

"Chevron Frade Field Incident," YouTube, Nov. 24, 2011, 11 pages [retrieved from: www.youtube.com/watch?v=OtJT14nv1Ql].

(Continued)

*Primary Examiner* — Phuong Huynh
(74) *Attorney, Agent, or Firm* — Sheridan Ross P.C.

(57) ABSTRACT

Systems and methods for monitoring underwater structures are provided. First and second sets of point cloud data that are obtained at different times are compared to determine whether the location of the underwater structure has changed. For detecting vibration, a series of range measurements taken along a line intersecting the underwater structure are compared to one another to determine an amplitude and frequency of any vibration present in the underwater structure. For detecting temperature, the ratio of different components of return signals obtained from a point in the water surrounding the underwater structure is measured to derive the temperature of the water. Leak detection can be performed by scanning areas around the underwater structure. Monitoring systems can include a primary receiver for range measurements, and first and second temperature channel receivers for temperature measurements.

22 Claims, 21 Drawing Sheets

Related U.S. Application Data continuation of application No. 15/971,108, filed on May 4, 2018, now Pat. No. 11,249,193.

(60) Provisional application No. 62/501,487, filed on May 4, 2017.

(51) Int. Cl.

| | |
|---|---|
| *G01M 3/04* | (2006.01) |
| *G01M 3/20* | (2006.01) |
| *G01M 3/24* | (2006.01) |
| *G01M 3/38* | (2006.01) |
| *G01S 17/89* | (2020.01) |
| *G01V 8/00* | (2006.01) |
| *G01V 8/10* | (2006.01) |
| *G01S 17/50* | (2006.01) |

(52) U.S. Cl.
   CPC .............. *G01M 3/24* (2013.01); *G01M 3/38* (2013.01); *G01V 8/00* (2013.01); *G01V 8/10* (2013.01); *G01K 13/026* (2021.01); *G01S 17/50* (2013.01)

(56) References Cited

U.S. PATENT DOCUMENTS

| | | | |
|---|---|---|---|
| 4,759,897 A | 7/1988 | Tolino et al. | |
| 4,893,924 A | 1/1990 | Leonard et al. | |
| 5,026,999 A | 6/1991 | Leonard | |
| 5,069,580 A | 12/1991 | Herwig et al. | |
| 5,152,957 A | 10/1992 | Terai et al. | |
| 5,257,085 A | 10/1993 | Ulich et al. | |
| 5,311,272 A | 5/1994 | Daniels et al. | |
| 5,343,284 A | 8/1994 | Keeler et al. | |
| 5,384,589 A | 1/1995 | Ulich et al. | |
| 5,809,099 A | 9/1998 | Kim et al. | |
| 5,912,934 A | 6/1999 | Acks et al. | |
| 6,672,131 B1 | 1/2004 | Aldal et al. | |
| 6,700,835 B1 | 3/2004 | Ward et al. | |
| 6,836,285 B1 | 12/2004 | Lubard et al. | |
| 7,139,647 B2 | 11/2006 | Larsen | |
| 7,683,928 B2 | 3/2010 | Lubard et al. | |
| 7,688,348 B2 | 3/2010 | Lubard et al. | |
| 8,184,276 B2 | 5/2012 | Embry | |
| 8,380,375 B2 | 2/2013 | Tink | |
| 8,467,044 B2 | 6/2013 | Embry | |
| 8,781,790 B2 | 7/2014 | Zhu et al. | |
| 8,891,069 B2 | 11/2014 | Pedersen et al. | |
| 8,903,576 B2 | 12/2014 | Tink | |
| 8,929,176 B2 | 1/2015 | Debrunner et al. | |
| 8,953,647 B1 | 2/2015 | Mead et al. | |
| 8,960,008 B1 | 2/2015 | Blackmon et al. | |
| 9,223,025 B2 | 12/2015 | Debrunner et al. | |
| 9,229,108 B2 | 1/2016 | Debrunner et al. | |
| 9,234,618 B1 | 1/2016 | Zhu et al. | |
| 9,330,633 B2 | 5/2016 | Sakai et al. | |
| 9,348,026 B2 | 5/2016 | Armbruster et al. | |
| 9,511,831 B2 | 12/2016 | Kimura et al. | |
| 9,568,590 B1 | 2/2017 | Haupt et al. | |
| 9,776,695 B2 | 10/2017 | Kimura et al. | |
| 9,791,555 B2 | 10/2017 | Zhu | |
| 9,846,232 B1 | 12/2017 | Thompson et al. | |
| 10,018,726 B2 | 7/2018 | Hall et al. | |
| 10,116,841 B2 | 10/2018 | Boyle et al. | |
| 10,116,842 B2 | 10/2018 | Boyle et al. | |
| 10,158,793 B2 | 12/2018 | Boyle et al. | |
| 10,163,213 B2 | 12/2018 | Boyle et al. | |
| 10,183,732 B2 | 1/2019 | Celikkol et al. | |
| 10,321,810 B2 | 6/2019 | Ikuta et al. | |
| 10,450,041 B2 | 10/2019 | Kimura et al. | |
| 10,502,829 B2 | 12/2019 | Embry et al. | |
| 10,545,233 B1 | 1/2020 | Embry et al. | |
| 10,571,567 B2 | 2/2020 | Campbell et al. | |
| 10,571,687 B2 | 2/2020 | Johnson | |
| 10,627,516 B2 | 4/2020 | Eichenholz | |
| 10,698,112 B2 | 6/2020 | Embry et al. | |
| 10,714,889 B2 | 7/2020 | Hong et al. | |
| 10,838,042 B2 | 11/2020 | Badoni et al. | |
| 10,845,482 B2 | 11/2020 | Frederiksen et al. | |
| 10,871,567 B2 | 12/2020 | Embry et al. | |
| 11,125,875 B2 | 9/2021 | Embry et al. | |
| 11,249,193 B2 | 2/2022 | Embry et al. | |
| 11,774,586 B2 | 10/2023 | Embry et al. | |
| 12,019,159 B2 | 6/2024 | Embry et al. | |
| 2002/0038187 A1 | 3/2002 | Maness et al. | |
| 2002/0170792 A1 | 11/2002 | Phelan et al. | |
| 2003/0079774 A1 | 5/2003 | Reyman | |
| 2004/0093174 A1 | 5/2004 | Lander | |
| 2004/0261547 A1 | 12/2004 | Russell et al. | |
| 2005/0060105 A1 | 3/2005 | Lander | |
| 2005/0279169 A1 | 12/2005 | Lander | |
| 2006/0221349 A1 | 10/2006 | Que et al. | |
| 2006/0233485 A1 | 10/2006 | Allen | |
| 2007/0095153 A1 | 5/2007 | Rieder et al. | |
| 2007/0130317 A1 | 6/2007 | Lander | |
| 2007/0199383 A1 | 8/2007 | Lander et al. | |
| 2007/0242134 A1 | 10/2007 | Zernov | |
| 2008/0300742 A1 | 12/2008 | Weaver et al. | |
| 2009/0114140 A1 | 5/2009 | Guerrero et al. | |
| 2009/0141591 A1 | 6/2009 | Basilico | |
| 2009/0225925 A1 | 9/2009 | Eisner et al. | |
| 2009/0287414 A1 | 11/2009 | Vickery | |
| 2010/0037707 A1 | 2/2010 | Bitto et al. | |
| 2010/0089161 A1 | 4/2010 | Taheri | |
| 2010/0324839 A1 | 12/2010 | Martin | |
| 2011/0088910 A1 | 4/2011 | McCann et al. | |
| 2011/0116074 A1 | 5/2011 | Valla et al. | |
| 2011/0144930 A1 | 6/2011 | Bruno et al. | |
| 2011/0197681 A1 | 8/2011 | Rieder et al. | |
| 2012/0007743 A1 | 1/2012 | Solomon | |
| 2012/0022822 A1 | 1/2012 | Rousselle | |
| 2012/0062963 A1 | 3/2012 | Gillham et al. | |
| 2012/0099395 A1 | 4/2012 | Debrunner et al. | |
| 2012/0124850 A1 | 5/2012 | Ortleb et al. | |
| 2012/0213320 A1 | 8/2012 | Lange et al. | |
| 2012/0266803 A1 | 10/2012 | Zediker et al. | |
| 2013/0030577 A1 | 1/2013 | Jarrell et al. | |
| 2013/0061688 A1 | 3/2013 | Hayward | |
| 2013/0206967 A1 | 8/2013 | Shpunt | |
| 2013/0215012 A1 | 8/2013 | Reddy et al. | |
| 2014/0003193 A1 | 1/2014 | Schmidt et al. | |
| 2014/0022530 A1 | 1/2014 | Farhadiroushan et al. | |
| 2014/0054429 A1 | 2/2014 | Conzen et al. | |
| 2014/0078409 A1 | 3/2014 | Wang et al. | |
| 2014/0174186 A1 | 6/2014 | Salomon | |
| 2014/0268107 A1 | 9/2014 | Kremeyer | |
| 2014/0283585 A1 | 9/2014 | Sæther | |
| 2014/0300885 A1* | 10/2014 | Debrunner ............... G01S 17/42 |
| | | | 356/4.01 |
| 2014/0320629 A1 | 10/2014 | Chizeck et al. | |
| 2014/0328141 A1 | 11/2014 | Rikoski et al. | |
| 2015/0078123 A1 | 3/2015 | Batcheller et al. | |
| 2015/0116692 A1 | 4/2015 | Zuk et al. | |
| 2015/0153743 A1 | 6/2015 | Jarrell et al. | |
| 2015/0363914 A1 | 12/2015 | Boyle et al. | |
| 2016/0012925 A1 | 1/2016 | Ahlberg | |
| 2016/0155523 A1 | 6/2016 | Kramer et al. | |
| 2016/0198069 A1 | 7/2016 | Boyle et al. | |
| 2016/0198074 A1 | 7/2016 | Boyle et al. | |
| 2016/0306040 A1 | 10/2016 | Hunt et al. | |
| 2016/0320526 A1 | 11/2016 | Chen et al. | |
| 2017/0089829 A1 | 3/2017 | Bartholomew | |
| 2017/0328751 A1 | 11/2017 | Lemke | |
| 2017/0328982 A1 | 11/2017 | Jongsma et al. | |
| 2018/0194446 A1 | 7/2018 | Fruhling et al. | |
| 2018/0284274 A1 | 10/2018 | LaChapelle | |
| 2019/0019266 A1 | 1/2019 | Boyle et al. | |
| 2019/0031308 A1 | 1/2019 | Daley et al. | |
| 2019/0084658 A1 | 3/2019 | Bonel et al. | |
| 2019/0234808 A1 | 8/2019 | Speck et al. | |
| 2020/0126681 A1 | 4/2020 | Mann | |
| 2020/0164788 A1 | 5/2020 | Roth et al. | |
| 2021/0141085 A1 | 5/2021 | Embry et al. | |

(56)        References Cited

U.S. PATENT DOCUMENTS

| | | | |
|---|---|---|---|
| 2022/0102018 A1 | 3/2022 | Embry et al. | |
| 2022/0146644 A1 | 5/2022 | Butler et al. | |
| 2023/0393271 A1 | 12/2023 | Embry et al. | |

FOREIGN PATENT DOCUMENTS

| | | |
|---|---|---|
| BR | 11-2020-000387 | 7/2020 |
| CA | 3069305 | 1/2019 |
| CA | 3069309 | 1/2019 |
| CN | 105716591 | 6/2016 |
| CN | 106199991 | 12/2016 |
| CN | 110441792 | 11/2019 |
| CN | 210487977 | 5/2020 |
| EP | 1321777 | 6/2003 |
| EP | 2866051 | 4/2015 |
| EP | 3524949 | 8/2019 |
| EP | 3652474 | 5/2020 |
| EP | 3652929 | 5/2020 |
| JP | 2017-187442 | 10/2017 |
| KR | 101426474 | 8/2014 |
| KR | 2016-0146390 | 12/2016 |
| WO | WO 99/29463 | 6/1999 |
| WO | WO 2011/161513 | 12/2011 |
| WO | WO 2014/013244 | 1/2014 |
| WO | WO 2015/011270 | 1/2015 |
| WO | WO 2016/068715 | 5/2016 |
| WO | WO 2016/142576 | 9/2016 |
| WO | WO 2019/014245 | 1/2019 |
| WO | WO 2019/014253 | 1/2019 |
| WO | WO 2020/076336 | 4/2020 |
| WO | WO 2021/143665 | 7/2021 |

OTHER PUBLICATIONS

"Infrared Thermometers," Williamson, 2008, 11 pages.

"Subsea Acceleration and Vibration Logger," Omni Instruments, 2009, 4 pages [retrieved online from: www.omniinstruments.co.uk/subsea-acceleration-and-vibration-logger.html].

"Subsea Leak Detection—an Overview," Neptune Oceanographics Limited, 2015, 5 pages [retrieved online from: www.neptuneoceanographics.com/documents/LeakReport2015.pdf].

"Subsea Piping Vibration For new and existing systems," Wood, 2018, 3 pages [retrieved online from: www.betamachinery.com/services/subsea-piping-vibration].

"Ultrasonic Intelligent Sensors ClampOn Subsea 3D Vibration Monitor Digital Signal Processing," ClampOn AS, May 2016, 2 pages.

Artlett et al., "Optical remote sensing of water temperature using Raman spectroscopy," Optics Express, vol. 23, No. 25, Dec. 14, 2015, 13 pages.

Behroozpour et al., "Lidar System Architectures and Circuits," IEEE Communications Magazine, Oct. 2017, pp. 135-142.

Coimbra et al. "Chevron fined $28 million, faces Brazil spill backlash," Reuters, Nov. 21, 2011, 12 pages [retrieved online from: www.reuters.com/article/us-chevron-brazil/chevron-fined-28-million-faces-brazil-spill-backlash-idUSTRE7AG15S20111122].

Embry, "High Resolution 3D Laser Imaging for Inspection, Maintenance, Repair, and Operations," RPSEA Phase 1 Final Report, Mar. 9, 2012, 48 pages.

Hariharan et al. "Drilling Riser Management In Deepwater Environments," Pulse Structural Monitoring, Feb. 2007, 9 pages [retrieved online from: www.pulse-monitoring.com/assets/uploads/cms/files/118-64.pdf].

Ishida et al., "Marker based camera pose estimation for underwater robots," 2012 IEEE/SICE International Symposium on System Integration, Kyushu University, Fukuoka, Japan, Dec. 16-18, 2012, 6 pages.

Isomäki et al., "Monitoring of the Submerged Structures of Dams," VRT Finland, 84th ICOLD Annual Meeting, May 20, 2016, 8 pages.

Jacobson et al. "AUV-based 3D laser imaging," Offshore Engineer, Mar. 27, 2014, 5 pages [retrieved online from: www.oedigital.com/news/456412-auv-based-3d-laser-imaging].

Kim et al., "LAROB: Laser-Guided Underwater Mobile Robot for Reactor Vessel Inspection," IEEE/ASME Transactions on Mechatronics, vol. 19, No. 4, Aug. 2014, pp. 1216-1225.

Leonard et al., "Experimental remote sensing of subsurface temperature in natural ocean water," Geophysical Research Letters, vol. 4, No. 7, Jul. 1977, pp. 279-281. Abstract only.

Lim et al. "Deepwater Riser VIV, Fatigue and Monitoring," Presented at Deepwater Pipeline & riser Technology Conference, Houston, Mar. 6-9, 2000, 12 pages [retrieved online from: www.puls-monitoring.com/assets/uploads/cms/files/135-64.pdf].

Mai et al., "Subsea Infrastructure Inspection: A Review Study," 6th International Conference on Underwater System Technology: Theory and Applications, Dec. 2016, 7 pages.

Mckeever et al., "The Thermographic Phosphor Labkit," 2015 BFY Proceedings, American Association of Physics Teachers, Nov. 2015, pp. 68-71.

Moltisanti et al. "Monitoring Accropodes Breakwaters using RGB-D Cameras," Proceedings of the 10th International Conference on Computer Vision Theory and Applications (VISAPP-2015), 2015, pp. 76-83.

Nilson "Ultrasonic Intelligent Sensors Advanced LPHP Subsea 3D Vibration Monitor," ClampOn AS, Jun. 2016, Revision 3, 2 pages.

Nilson "Ultrasonic Intelligent Sensors Standalone LPHP Subsea Vibration Monitor," ClampOn AS, Jun. 2016, Revision 4, 2 pages.

Otto et al., "Thermo-Chromium: A Contactless Optical Molecular Thermometer," Chemistry, vol. 23, 2017, pp. 12131-12135.

Park et al., "Visualization using 3D voxelization of full lidar waveforms," Institute of Electrical and Electronics Engineers, Proceedings of SPIE, vol. 9262, Nov. 17, 2014, 10 pages.

Paschoa "Understanding Subsea Acoustic Leak Detection and Condition Monitoring—Part 2," Marine Technology News, Oct. 7, 2014, 7 pages [retrieved online from: https://www.marinetechnologynews.com/blogs/understanding-subsea-accoustic-leak-detection-and-condition-omonitoring-e28093-part-2-700516].

Prats et al. "Template Tracking and Visual Servoing for Alignment Tasks with Autonomous Underwater Vehicles," The International Federation of Automatic Control, Sep. 19-21, 2012, 9th IFAC Conference on Manoeuvring and Control of Marine Craft, 2012, Arenzano, Italy, 6 pages.

Schorstein et al., "Depth-resolved temperature measurements of water using the Brillouin lidar technique," Applied Physics B, vol. 97, No. 931, Jul. 24, 2009, pp. 931-934. Abstract only.

Sedlazeck et al., "Perspective and Non-perspective Camera Models in Underwater Imaging—Overview and Error Analysis," in Outdoor and Large-Scale Real-World Scene Analysis (eds. Dellaert et al.), 15th International Workshop on Theoretical Foundations of Computer Vision, Jun. 26, 2011, pp. 212-242.

Skalle et al. "Wells and Well Intervention, Evaluation of deepwater kicks and future countermeasures," Norwegian University of Science and Technology, Mar. 2012, 15 pages [retrieved online from: www.ipt.ntnu.no/~pskalle/files/TechnicalPapers/23_deepwaterkick.pdf].

International Search Report and Written Opinion for International (PCT) Patent Application No. PCT/US2018/031021, dated Aug. 30, 2018 18 pages.

International Preliminary Report on Patentability for International (PCT) Application No. PCT/US2018/031021, dated Nov. 14, 2019, 14 pages.

Official Action for Australia Patent Application No. 2018261777, dated May 11, 2022, 3 pages.

Official Action for Australia Patent Application No. 2018261777, dated Jan. 5, 2023, 4 pages.

Notice of Acceptance for Australia Patent Application No. 2018261777, dated Apr. 26, 2023, 3 pages.

Official Action for Australia Patent Application No. 2022283612, dated Nov. 24, 2023, 7 pages.

Official Action for Australia Patent Application No. 2022283612, dated Feb. 24, 2024 3 pages.

Official Action for Australia Patent Application No. 2022283612, dated Jun. 25, 2024, 3 pages.

(56)  References Cited

OTHER PUBLICATIONS

Official Action (with English summary) for Brazil Patent Application No. BR112019022828-4, dated Sep. 9, 2022, 5 pages.

Official Action for Canada Patent Application No. 3062453, dated Oct. 19, 2023, 7 pages.

Notice of Allowance for Brazil Patent Application No. BR112019022828-4, dated Apr. 4, 2023, 2 pages.

Extended European Search Report for Europe Patent Application No. 18794108.3, dated Dec. 1, 2020, 13 pages.

Article 94(3) Communication for Europe Patent Application No. 18794108.3, dated May 2, 2022, 7 pages.

Official Action for European Patent Application No. 18794108.3, dated Oct. 27, 2023 11 pages.

Official Action for U.S. Appl. No. 15/971,108, dated Dec. 28, 2020, 7 pages. Restriction Requirement.

Official Action for U.S. Appl. No. 15/971,108, dated Mar. 9, 2021, 17 pages.

Notice of Allowance for U.S. Appl. No. 15/971,108, dated Oct. 7, 2021, 13 pages.

Official Action for U.S. Appl. No. 16/365,848, dated Jun. 24, 2019, 10 pages. Restriction Requirement.

Official Action for U.S. Appl. No. 16/365,848, dated Oct. 18, 2019, 17 pages.

Notice of Allowance for U.S. Appl. No. 16/365,848, dated Apr. 8, 2020, 10 pages.

Official Action for U.S. Appl. No. 17/569,685, dated Feb. 6, 2023, 7 pages. Restriction Requirement.

Official Action for U.S. Appl. No. 17/569,685, dated Aug. 9, 2023, 21 pages.

Notice of Allowance for U.S. Appl. No. 17/569,685, dated Feb. 16, 2024, 12 pages.

U.S. Appl. No. 16/365,848, filed Mar. 27, 2019, now issued as U.S. Pat. No. 10,698,112.

U.S. Appl. No. 16/031,812, filed Jul. 10, 2018, now issued as U.S. Pat. No. 10,871,567.

U.S. Appl. No. 16/707,204, filed Dec. 9, 2019, now issued as U.S. Pat. No. 11,125,875.

U.S. Appl. No. 15/971,108, filed May 4, 2018, now issued as U.S. Pat. No. 11,249,193.

U.S. Appl. No. 14/408,948, filed Aug. 23, 2021, now issued as U.S. Pat. No. 11,774,586.

U.S. Appl. No. 17/569,685, filed Jan. 6, 2022, now issued as U.S. Pat. No. 12,019,159.

U.S. Appl. No. 17/093,932, filed Nov. 10, 2020, published as U.S. Pub. No. 2021/0141085.

U.S. Appl. No. 17/486,566, filed Sep. 27, 2021, published as U.S. Pub. No. 2022/0102018.

U.S. Appl. No. 18/236,291, filed Aug. 21, 2023, published as U.S. Pub. No. 2023/039271.

U.S. Appl. No. 18/618,818, filed Mar. 27, 2024.

Official Action for Canada Patent Application No. 3062453, dated Aug. 12, 2024, 5 pages.

Article 94(3) Communication for Europe Patent Application No. 18794108.3, dated Aug. 22, 2025, 6 pages.

Official Action for Australia Patent Application No. 2024205602, dated Dec. 9, 2025, 7 pages.

* cited by examiner

312
FIG.5A
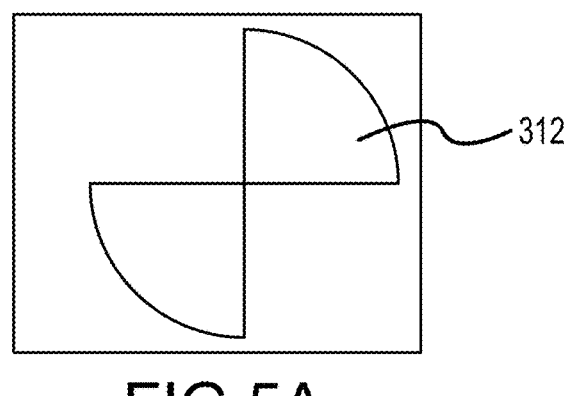
312
312
504
FIG.5B
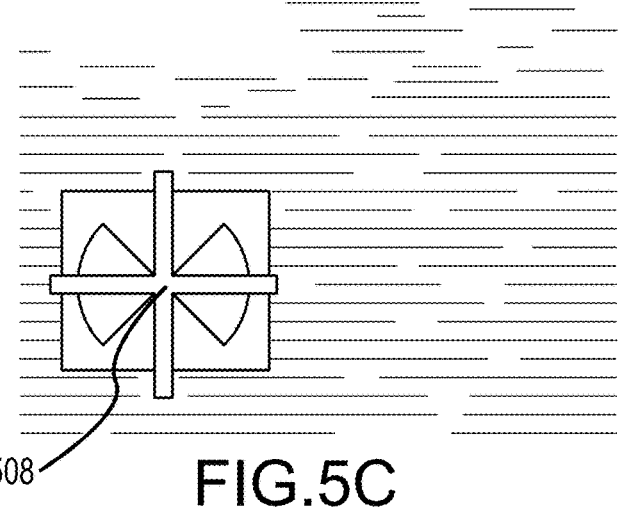
508
FIG.5C

SYSTEMS AND METHODS FOR MONITORING UNDERWATER STRUCTURES

CROSS-REFERENCE TO RELATED APPLICATIONS

The present application is a continuation of U.S. patent application Ser. No. 17/569,685, filed Jan. 6, 2022, which is a continuation of U.S. patent application Ser. No. 15/971, 108, filed May 4, 2018, now U.S. Pat. No. 11,249,193, which claims the benefit of U.S. Provisional Patent Application Ser. No. 62/501,487, filed May 4, 2017, the entire disclosures of each of which are hereby incorporated herein by reference. The present application is related to U.S. patent application Ser. No. 16/365,848, filed Mar. 27, 2019, now U.S. U.S. Pat. No. 10,698,112, which is also a continuation of U.S. patent application Ser. No. 15/971,108, filed May 4, 2018, which claims the benefit of U.S. Provisional Patent Application Ser. No. 62/501,487, filed May 4, 2017.

FIELD

The present disclosure is directed to methods and systems for monitoring underwater installations and in particular to non-contact monitoring of underwater structures and equipment.

BACKGROUND

Monitoring underwater equipment, such as wellheads, manifolds, risers, anchors, Pipeline End Terminations (PLETS), Blow Out Preventors (BOPs), pumps, touch down points, suction piles, chains, slip joints, and pipelines is important to ensuring the safe and reliable operation of such equipment. Through environmental and/or operational conditions, such underwater equipment can experience undesirable movement, vibration conditions, and temperature differentials. For example, vortex-induced vibration (VIV) is responsible for the majority of the fatigue damage in deep water drilling risers. Damage from VIV is a major issue and is potentially very dangerous for operational personnel and the environment.

Conventional techniques for detecting and monitoring movement and vibration require the installation of vibration, accelerometers, and/or motion sensors directly on the equipment to be monitored. Accordingly, available systems require that they be physically attached to the equipment, either by integrating a monitoring device into the equipment prior to putting the equipment in operation, or by attaching the monitoring device to the equipment while that equipment is in place. Moreover, each underwater structure to be monitored requires its own vibration, accelerometer, and/or motion sensor.

External temperature variations of subsea components are an indication of internal issues within the system. For instance, hot spots can indicate cracks in insulation, overheating pumps, thinning of internal pipe walls, or other problems. Cold spots can indicate hydrate formations inside pipes or equipment that either reduce or totally block flow, and other problems. Currently the only way to measure these temperature deltas are with point probes either attached to the subsea equipment or carried by a diver or remote vehicle. This provides a very sparse temperature "map" with many gaps.

In addition, access to equipment installed on the seafloor can be difficult, and the installation of additional devices directly on the monitored equipment poses the risk of damaging that subsea equipment. The devices installed must be connected to subsea power sources, or have batteries installed (which requires periodic changing). The data recorded by the devices must be downloaded periodically, which typically requires a direct connection for large amounts of data. Both of these scenarios require contact of the subsea equipment by divers, Remote Operated Vehicles (ROVs), or Autonomous Underwater Vehicles (AUVs), which is costly and risks damaging expensive subsea equipment. Accordingly, it would be desirable to provide systems and methods that allowed for the monitoring of underwater equipment, without requiring monitors that are directly attached to such equipment, and preferably a single monitoring device to provide multiple monitoring functions.

SUMMARY

The present disclosure provides devices, systems and methods for the monitoring of any and all-natural underwater structures or equipment installed underwater. In particular, it includes any and all equipment installed subsea for an oil or gas field and the accompanying seabed. This includes, but is not limited to, an entire subsea tree system, subsea manifold, PLET, BOP, pipelines and flow lines, anchors, risers, touch down points, suction piles, chains, slip joints, subsea processing systems, and the interconnectivity jumpers from the well to the surface delivery connection and surrounding seafloor. The described methods and systems increase the performance and integrity of the well monitoring solution during drilling, reservoir stimulation, well intervention, riserless well intervention, well pressure testing, and during plug and abandonment operations. The described methods and devices utilize one or more non-touch subsea optical systems (including laser systems) for subsea well and subsea infrastructure measurements and monitoring. Monitoring of underwater systems can include monitoring shifts in location over time, vibrations, temperature, and/or leaks. This includes but is not limited to vibrations caused by operating or environmental conditions, fluid leaks, and other dynamic conditions related to the monitored systems.

Systems in accordance with embodiments of the present disclosure can include various optical sensors provided as part of active, light-based metrology systems or sensors. In accordance with at least some embodiments of the present disclosure, a monitoring system is provided that includes a light detection and ranging system (hereinafter "lidar") monitoring device. In such embodiments, the lidar device can be in the form of a scanning lidar, flash lidar, pulsed laser lidar, amplitude modulated continuous wave (AMCW) phase detection lidar, chirped AMCW lidar, amplitude frequency modulated continuous wave (FMCW) lidar, true FMCW lidar, pulse modulation code, or other lidar system. Moreover, the lidar system can incorporate a pulsed or modulated continuous wave laser light source. Other embodiments can include a monitoring system incorporating a laser triangulation, photometric stereo, stereoscopic vision, structured light, photoclinometry, stereo-photoclinometry, holographic, digital holographic, or other device that uses light to sense 3-D space. The monitoring system is placed in the vicinity of the equipment to be monitored. In accordance with embodiments of the present disclosure, multiple pieces of equipment can be monitored by a single monitoring system. In accordance with further embodiments of the present disclosure, multiple monitoring systems are used in combination to monitor one or more pieces of subsea equipment. In accordance with still other embodiments of the present disclosure, targets, such as laser scanning targets, three-dimensional spherical targets, lidar targets, or other target indicia or structures can be attached to the monitored devices and observed by one or more monitoring systems.

In operation for displacement measurements, a monitoring system as disclosed herein makes a rapid number of range, angle, angle, and intensity measurements of the monitored equipment or other underwater structure in relation to the laser monitoring system itself, other pieces of equipment, monuments, or other "known" points in space, thus producing a set of point cloud data comprising a 3-D scan of the underwater scene. Alternately, the monitoring system makes a rapid number of range, angle, angle, and intensity measurements of specific targets mounted on the monitored equipment in relation to specific targets mounted on other pieces of equipment, monuments, or other "known" points in space. Change detection is performed on the point cloud data, which may comprise time stamped X, Y, Z, intensity datasets, to determine if movement of the monitored underwater structure has occurred over a selected time span (which can vary from under a minute to over a year). As opposed to a single spot lidar, multiple single spots can be scanned simultaneously. Alternately, a laser line scan system, triangulation sensor, structured light sensor, flash lidar, or other light-based metrology system could be used to make the range, angle, angle, and intensity measurements. As yet another alternative, scans can be taken from multiple optical or lidar devices simultaneously or in a time coordinated manner. In operation for vibration measurements, the monitoring system makes a rapid number of range, angle, angle, intensity measurements of a scene containing an underwater structure, thus producing a set of point cloud data. A particular location or locations on the underwater structure are then selected, and a rapid number of range, angle, angle, intensity measurements are made relative to a selected location in series. The timing of the range measurements is accurately recorded. Using the range and time measurements, vibration displacement (direct measurement) and frequency content (through a Fourier Transform or other calculation) can be calculated. A single spot sensor (such as a scanning lidar) can be programed to measure multiple locations in a fast succession in order to obtain vibration distance and frequency information at multiple known locations on the underwater structure at virtually the same time. This can then be used to calculate the vibration mode of the underwater structure. As a further alternative, a laser line scan system, triangulation sensor, structured light sensor, or flash lidar could be used to make range, angle, angle measurement on multiple points simultaneously. As yet another alternative, scans can be taken from multiple optical or lidar devices simultaneously or in a time coordinated manner.

In operation for temperature measurements, the monitoring system makes a rapid number of range, angle, angle, intensity measurements of the monitored underwater structure, thus producing an initial wide area 3-D scan that is quickly processed and displayed on the user screen. This initial image is used to identify target areas of interest for making a series of temperature measurements and can be created by 3-D data (range data) or 2-D data (just the intensity of the 3-D data). In either case the azimuth, elevation, and range locations are known for each point and can be used to revisit those exact locations on the target for temperature measurements taken from the water surrounding or near those locations. In particular, the temperature of the water is determined by the ratio of returned light of different wavelengths or polarizations. Note that this is significantly different from alternative systems for underwater temperature measurements. In those other systems the goal was to measure the general water temperature, so accurate location and range of the temperature measurement was not critical. When monitoring temperatures of equipment and subsea structures, one must be able to accurately select the location of the measurement in angle and range. The systems and methods of the current disclosure provide an accurate and repeatable method for selecting the angular and range location of where the temperature measurement is to be taken, thus allowing monitoring of specific locations upon a structure.

In a leak detection mode, the monitoring system is directed so that it takes range and intensity measurements along a direction at or towards an underwater structure or area being monitored. In accordance with at least some embodiments, the direction may be at or towards a control point. A leak is detected as a plume of liquid or gas bubbles having a density that is different than the underwater structure or the surrounding water. This difference in density can be detected as a difference in the strength (i.e. the intensity) of the return signal received by the monitoring system.

Advantages over current methods for vibration, motion, temperature measurements, and leak detection include enabling non-touch measurements and reduced tooling. Using an optical metrology system such as a lidar device reduces the installation time as compared to clamped tooling and subsea logged data recovery, and removes the risk associated with touching the subsea structures. The monitoring system of the present disclosure can be temporarily installed for short term monitoring, or permanently installed for long term monitoring of a subsea structure.

Additional features and advantages of embodiments of the present disclosure will become more readily apparent from the following description, particularly when taken together with the accompanying drawings.

BRIEF DESCRIPTION OF THE DRAWINGS

FIG. 5A depicts a 2-D target in accordance with embodiments of the present disclosure;

FIG. 5B depicts 2-D targets in a point cloud in accordance with embodiments of the present disclosure;

FIG. 5C depicts a centroid of a 2-D target in point cloud data in accordance with embodiments of the present disclosure;

DETAILED DESCRIPTION

Figure 1:
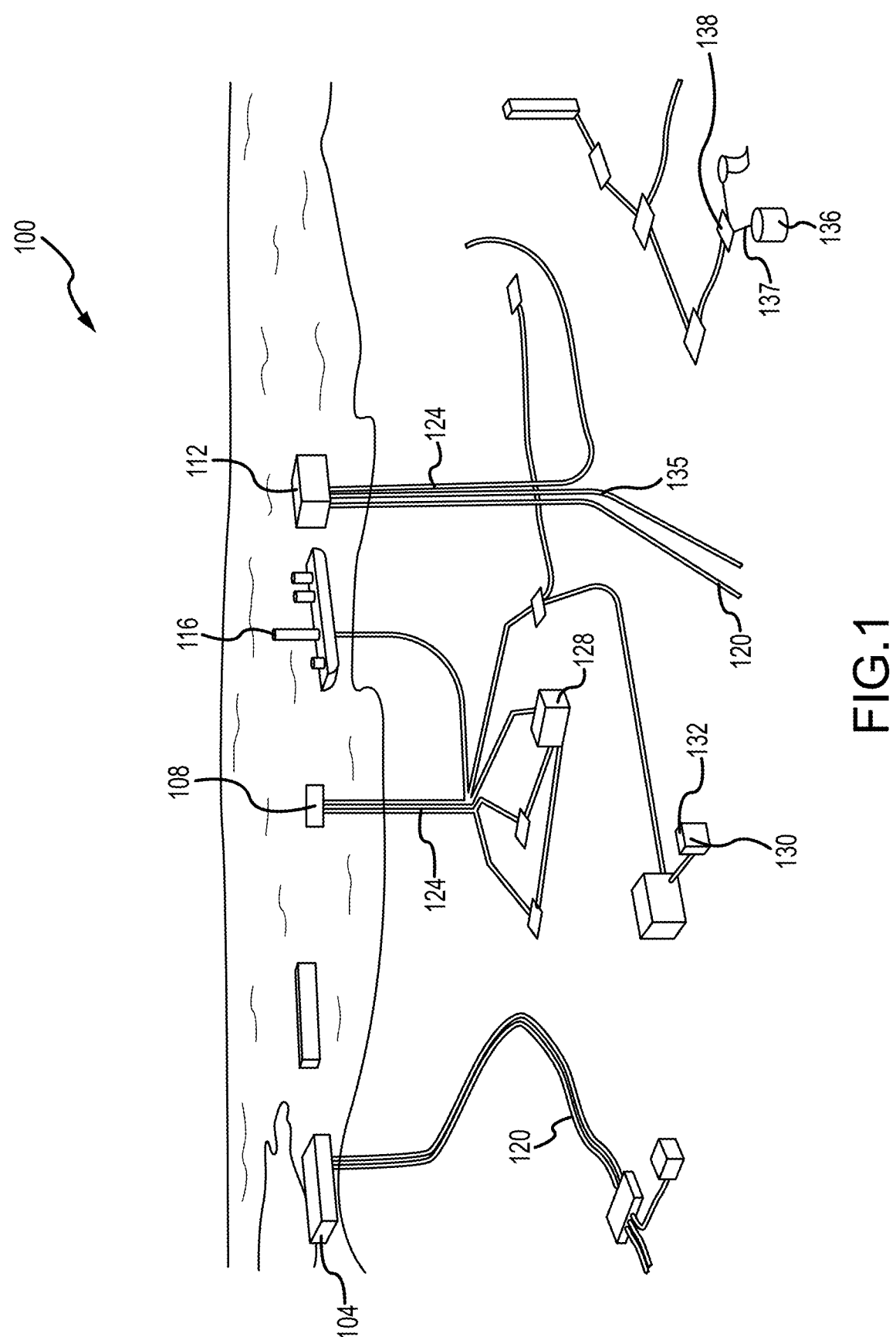
FIG. 1 depicts an example drilling and production system, the components of which can be monitored using systems and methods in accordance with embodiments of the present disclosure.

FIG. 1 depicts an example drilling and production system 100, the components of which can be monitored using systems and methods in accordance with embodiments of the present disclosure. The system 100 can include, for example and without limitation, processing platforms 104, jack-up platforms 108, floating platforms 112, pipelay vessels 116, pipelines 120, risers 124, manifolds 128, wells 130, touch down point 135, suction piles or anchors 136, chain 137, slip joints 138 and blowout preventers 132. The various components of the system 100 are subject to vibrations or other movements, temperature variations, and leaks, which can all be indications of internal issues with the system, the detection of some or all of which can be performed by embodiments of the present disclosure.

Figure 2:
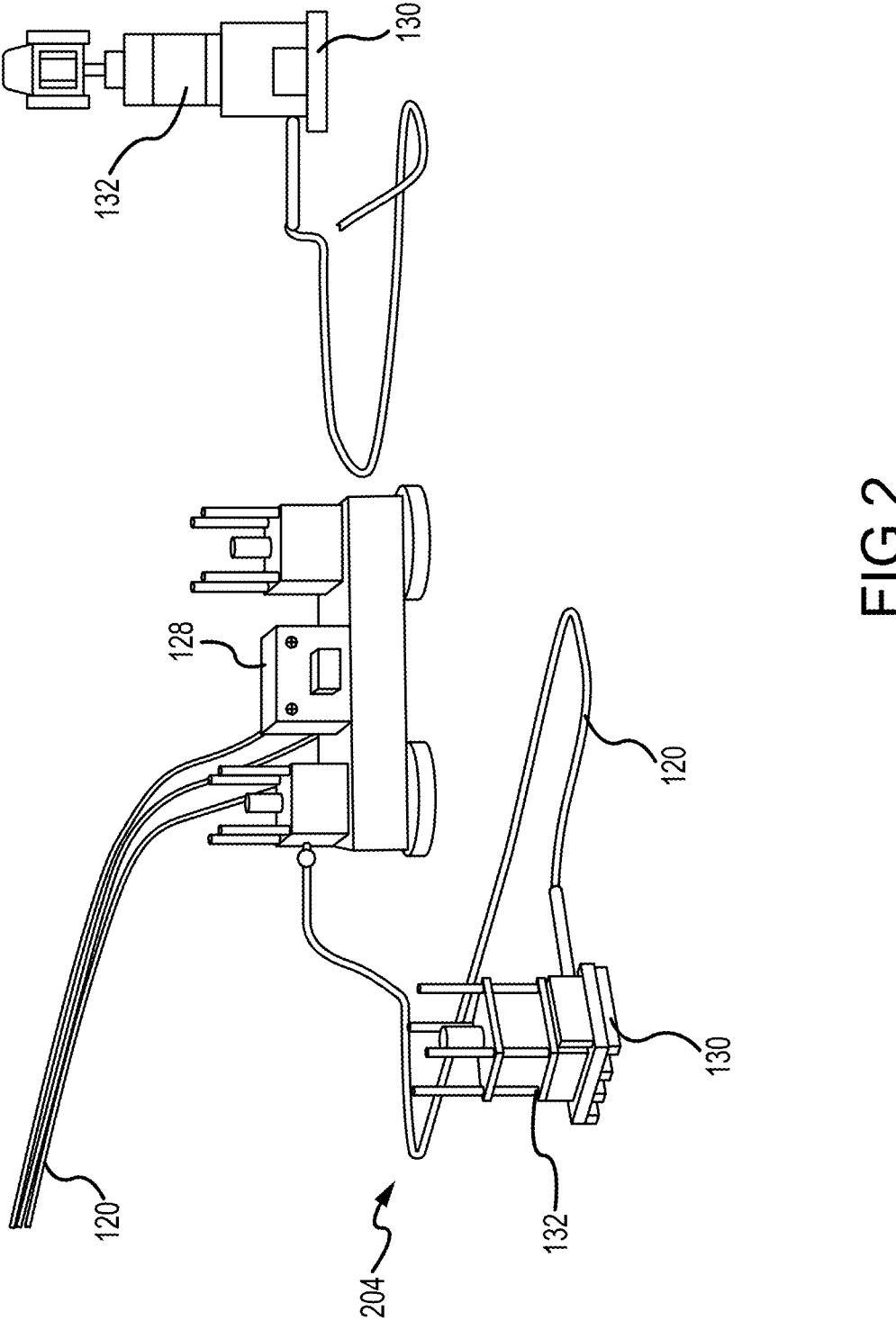
FIG. 2 depicts examples of components to be monitored by one or more monitoring systems in accordance with embodiments of the present disclosure.
Figure 3:
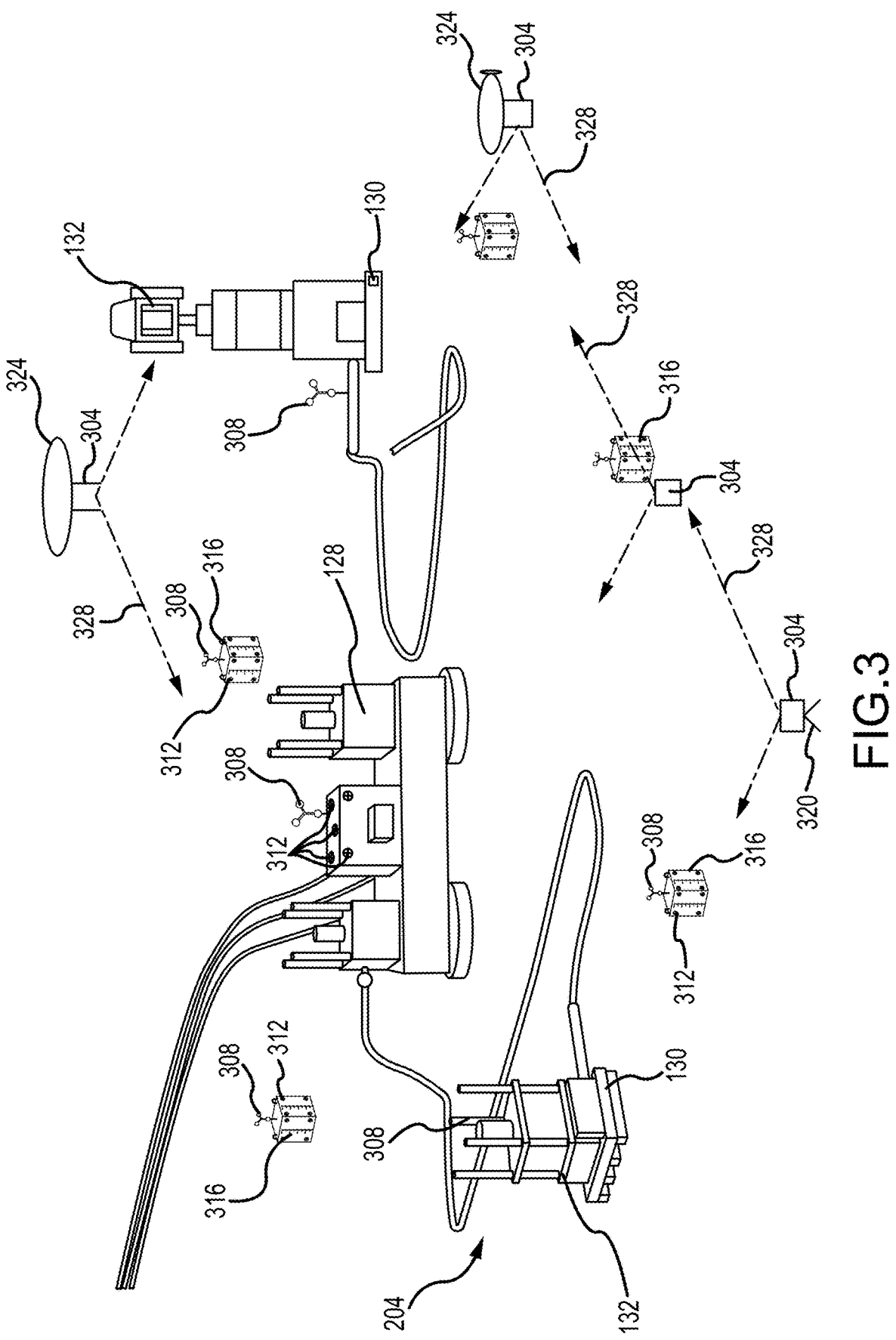
FIG. 3 depicts the components to be monitored of FIG. 2, together with monitoring systems and installed monuments and targets.

FIG. 2 depicts exemplary components 204, hereinafter referred to as underwater features or structures 204, within a system 100 that can be monitored by embodiments of the present disclosure. In this example, the underwater structures 204 include wells 130 and associated blowout preventers 132, pipelines 120, and a manifold 128. FIG. 3 depicts a scene that includes the components shown in FIG. 2, and in addition includes monitoring systems 304, mounted or applied targets, including mounted three-dimensional (3-D) spherical target structures 308 and applied two-dimensional (2-D) targets 312, and monuments 316, in accordance with various embodiments of the present disclosure. The monitoring systems 304 can comprise a lidar or other light-based 3-D sensor or metrology system, and can be mounted to stationary structures or platforms 320, can be placed directly on the sea floor, or can be mounted to an underwater vehicle 324, such as a remotely operated vehicle (ROV) or to an autonomous underwater vehicle (AUV).

As can be appreciated by one of skill in the art, a monitoring system 304 mounted to a stationary platform or structure 320 has an inherent conical field of regard 328. By incorporating a pan and tilt head in the monitoring system 304, the field of regard can be increased to a full 360°, or even to over a hemisphere field of regard. As can further be appreciated by one of skill in the art after consideration of the present disclosure, a monitoring system 304 mounted to a movable platform or vehicle 324 can be scanned, to obtain data in a push broom or flash camera fashion while the vehicle 324 moves to obtain data of large areas, or, for example where the vehicle is held stationary for some period of time, from within a conical field of regard. The fields of regard of the monitoring systems 304 are depicted in the figure as areas 328. Accordingly, it can be appreciated that a single monitoring system 304 in accordance with embodiments of the present disclosure can be positioned such that multiple components within a system 100 are within the field of regard 328 of the monitoring system 304. Moreover, components of the system 100 can be within the fields of regard 328 of multiple monitoring systems 304. As can be appreciated by one of skill in the art after consideration of the present disclosure, a monitoring system 304 can be operated to generate point cloud data, also referred to herein as simply a point cloud, which typically includes azimuth angle, elevation angle, intensity, and range information for a large number of points within a three-dimensional volume comprising a scene.

Figures 4A, 4B:
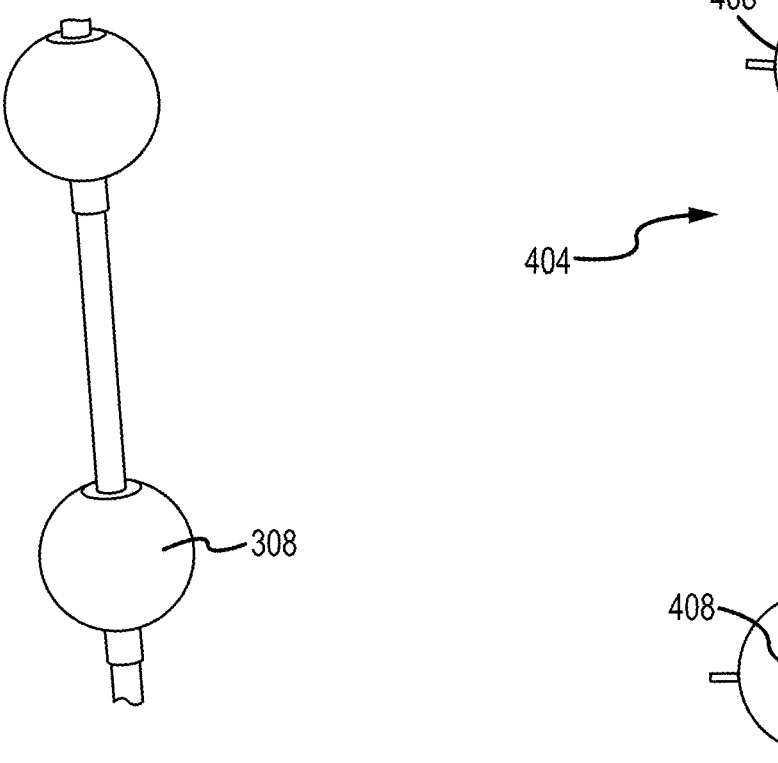
FIG. 4A depicts 3-D targets in accordance with embodiments of the present disclosure.
FIG. 4B depicts 3-D targets in a point cloud in accordance with embodiments of the present disclosure.

In accordance with embodiments of the present disclosure, three-dimensional 308 and/or two-dimensional 312 targets can be fixed to components within the system 100. These targets 308, 312 are specifically designed to provide control points within an image or within 3-D point cloud data produced by a monitoring system 304. FIG. 4A illustrates a three-dimensional target 308, and FIG. 4B depicts the three-dimensional target 308 within a point cloud 404 generated by a monitoring system 304. There are enough three-dimensional points in the point cloud data obtained by returns from target 308 to derive a central point or centroid 408 with a high degree of accuracy, usually within 1-2 mm. The 3-D targets 308 may be mounted to a structure 204. Omni-directional 3-D targets that are used topside are usually made of plastic. Three-dimensional targets 308 in accordance with embodiments of the present disclosure can be specially configured to work in the deep ocean so they hold their dimensions under extreme pressure and are resistant to corrosion. In accordance with further embodiments of the present disclosure, the 3-D targets 308 feature a Lambertian reflection. FIG. 5A shows a two-dimensional target 312, FIG. 5B depicts the 2-D target 312 within a point cloud 504, and FIG. 5C depicts a centroid 508 of the 2-D target 312 in point could data. These targets 312 can be painted or otherwise applied to a structure.

In accordance with some embodiments of the present disclosure, three-dimensional 308 and/or two dimensional 312 targets can be fixed to monuments 316 or upon any other structure, for example, pipelines 120, risers 124, manifolds 128, wells 130, touch down point 135, anchors, suction piles, pin piles, blowout preventers 132, or other components or examples of underwater structures 204. As can be appreciated by one of skill in the art after consideration of the present disclosure, the inclusion of targets 308 and 312 facilitates the reliable and repeatable monitoring of a specific location on a monitored component or structure 204 within a system 100, promoting the accuracy of measurements taken by the monitoring systems 304. This is through the highly accurate derived control points allowed by these designed targets 308, 312. As can also be appreciated by one of skill in the art after consideration of the present disclosure, measurements taken by one or more monitoring systems 304 can be compared to highly accurate top-side survey data of an individual component, known as dimensional control data. Moreover, by including monuments 316 and associated targets 308 and 312, the location of a system 100 component, or location on a component, at a particular point in time, can be determined with high accuracy (e.g., less than 1 cm). This is extremely useful for typical subsea field issues such as subsidence, well growth, linear or rotational movement, or scour. In accordance with still other embodiments of the present disclosure, the inclusion of a three-dimensional 308 or a two-dimensional 312 target is not required. Accordingly, the monitoring of legacy components within a system 100 that do not include such indicia 308 or 312, including seabed features themselves, is possible.

Figure 6:
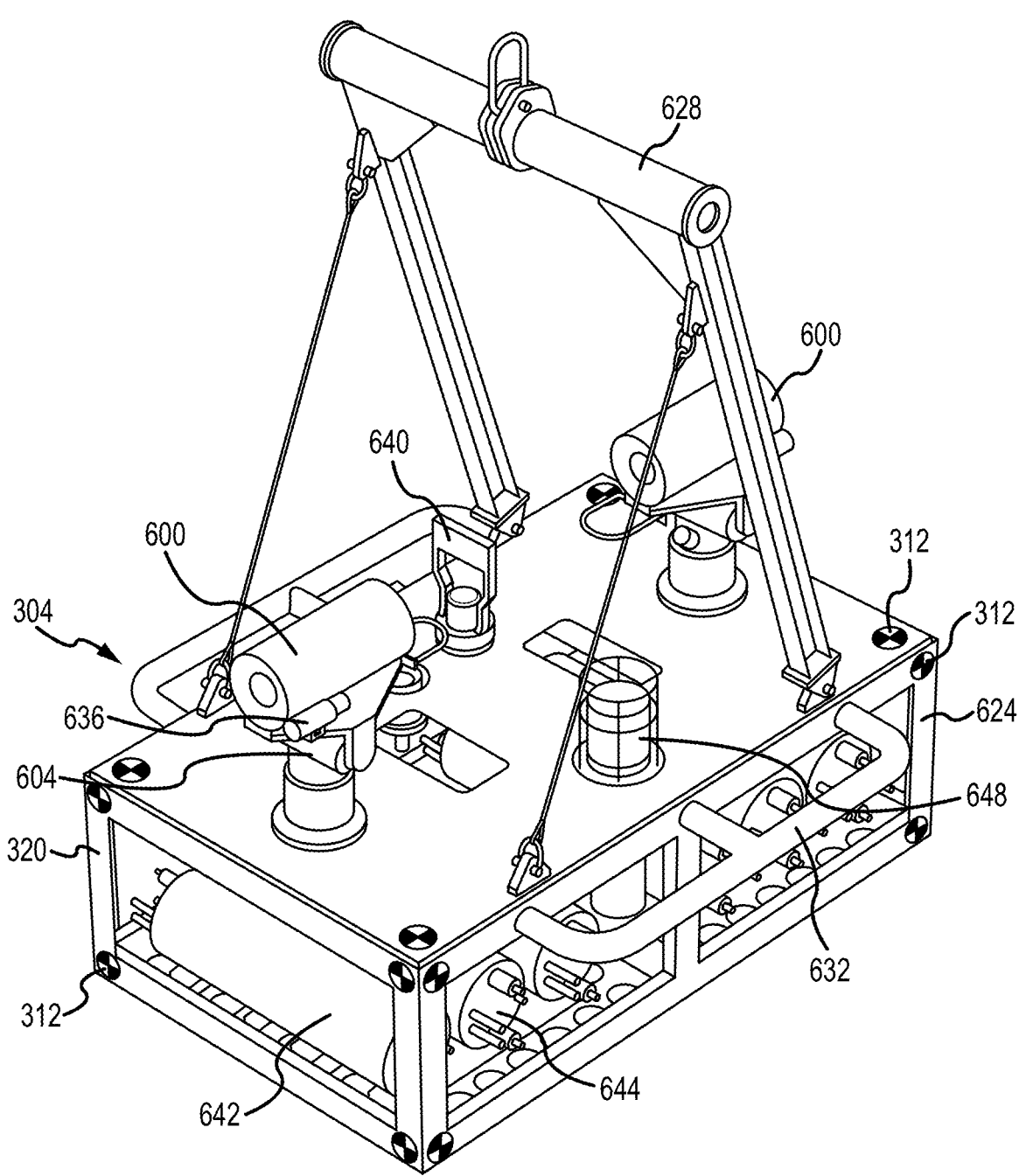
FIG. 6 depicts a monitoring system in accordance with embodiments of the present disclosure.

FIG. 6 depicts a monitoring system 304, mounted to a supporting structure 320, in accordance with at least some embodiments of the present disclosure. The monitoring system 304 generally includes one or more lidar devices 600 that can be pointed along a selected line of sight via a pan and tilt head 604 that connects the lidar device 600 to the supporting structure 320. Alternatively or in addition to a lidar device 600, a monitoring system 304 can include other optical metrology systems. The supporting structure 320 can comprise a frame 624 that is in turn mounted to a stationary pad, a mud mat, another structure on the seabed, or placed directly on the seabed. In accordance with other embodiments of the present disclosure, the frame 624 may be carried by a vehicle, such as an ROV. In accordance with still other embodiments of the present disclosure, a monitoring system 304 can be mounted to a vehicle via a pan and tilt head 604 or can be mounted directly to a vehicle.

In at least some embodiments of the present disclosure, the monitoring system 304 can itself comprise a subsea system with a platform with numerous selectable functions. The frame 624 can be designed to be lowered by a crane from the surface vessel or rig or can be designed to be deployed via an ROV. The frame 624 can be lowered using a crane lift 628. The lift 628 is on a hinge so it lowers after deployment. This allows the lift 628 to drop out of the field of view of the lidar devices 600. The frame 624 can also include ROV manipulator handles 632 to facilitate positioning the frame 624 using an ROV or AUV. For example, the frame 624 can be placed on a monument 316 or other structure. The bottom of the frame 624 can have a pin or receptacle, so it can be precisely lowered onto a mating receptacle or pin on a structure to enable precise location and alignment.

The support structure or frame 624 holds one or more lidar devices 600. Multiple lidars can be precisely located on the single structure so they create a single referenced point cloud. The lidar devices 600 can be mounted on pan/tilt units 604 to enable up to hemispherical coverage. Cameras and lights 636 can be mounted on the support structure 620 or the pan/tilt units 604 to enable visual inspection along with the lidar data. A hot stab 640 can be included which enables the monitoring system 304 to connect to the local infrastructure for power and or communications. The monitoring system 304 can further include one or more non-optical point sensors, such as a conductivity, temperature, and depth (CTD) device 642. Alternately or in addition, batteries and a power control system 644 can be included which allow for long-term autonomous deployment. The monitoring system 304 can also provide additional capabilities including, but not limited to, data storage and backup, vibration sensors, turbidity sensors, various chemical sensors, and communication devices. The monitoring system 304 can also provide timing signals (if needed) between multiple sensors to time-synchronize the data collection of multiple sensors, such as from multiple lidar devices 600 and/or cameras 636. The communication devices can include RF, optical, or acoustic devices. The communication devices can communicate with ROVs, AUVs, resident vehicles, other intelligent structures in the field, or systems on the surface. The monitoring system 304 can store data, compress and send out samples, or auto process for change detection, and can send alarms or other indications when change is detected. A single monitoring system 304 can provide power, data storage, and communications for other monitoring systems 304 or lidar devices 600, to support multiple monitoring points around the subsea equipment thereby allowing monitoring of underwater structures 204 from different angles.

An acoustic compatt 648 can be included which enables the monitoring system 304 to be geo-spatially located using an acoustic positioning system. These can include Ultra-Short Baseline (USBL), Long Baseline (LBL) or other acoustic positioning systems. 2-D targets 312 can be mounted to the frame 624 or other components of the monitoring system, and 3-D targets 308 can be mounted to the frame 624 or other components of the monitoring system 304, to facilitate precisely locating the monitoring system 304 within a field via another stationary or moving monitoring system 304 or lidar device 600.

Figure 7A:
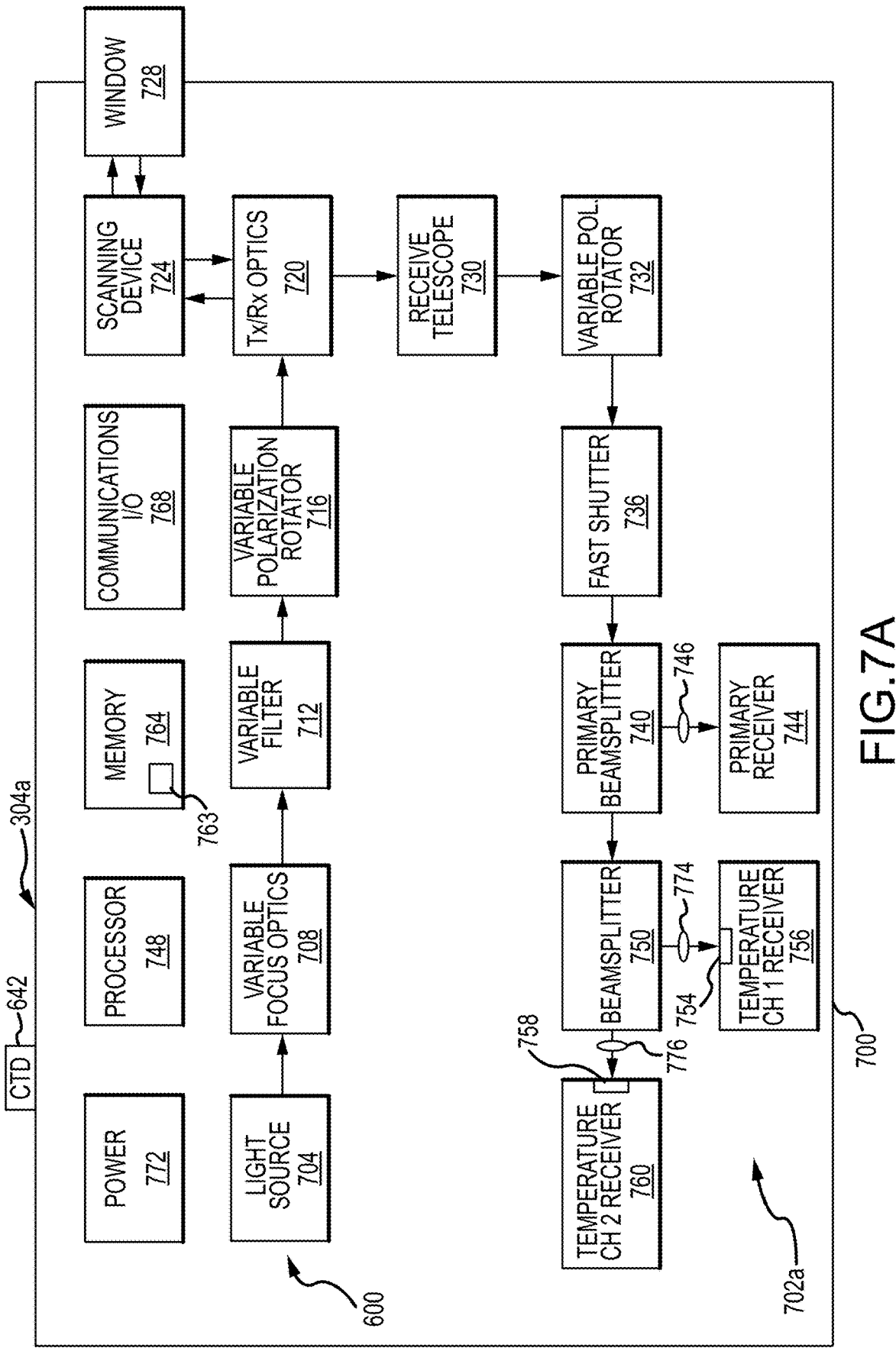
FIGS. 7A-7B are block diagrams depicting functional components of monitoring systems in accordance with embodiments of the present disclosure.
Figure 7B:
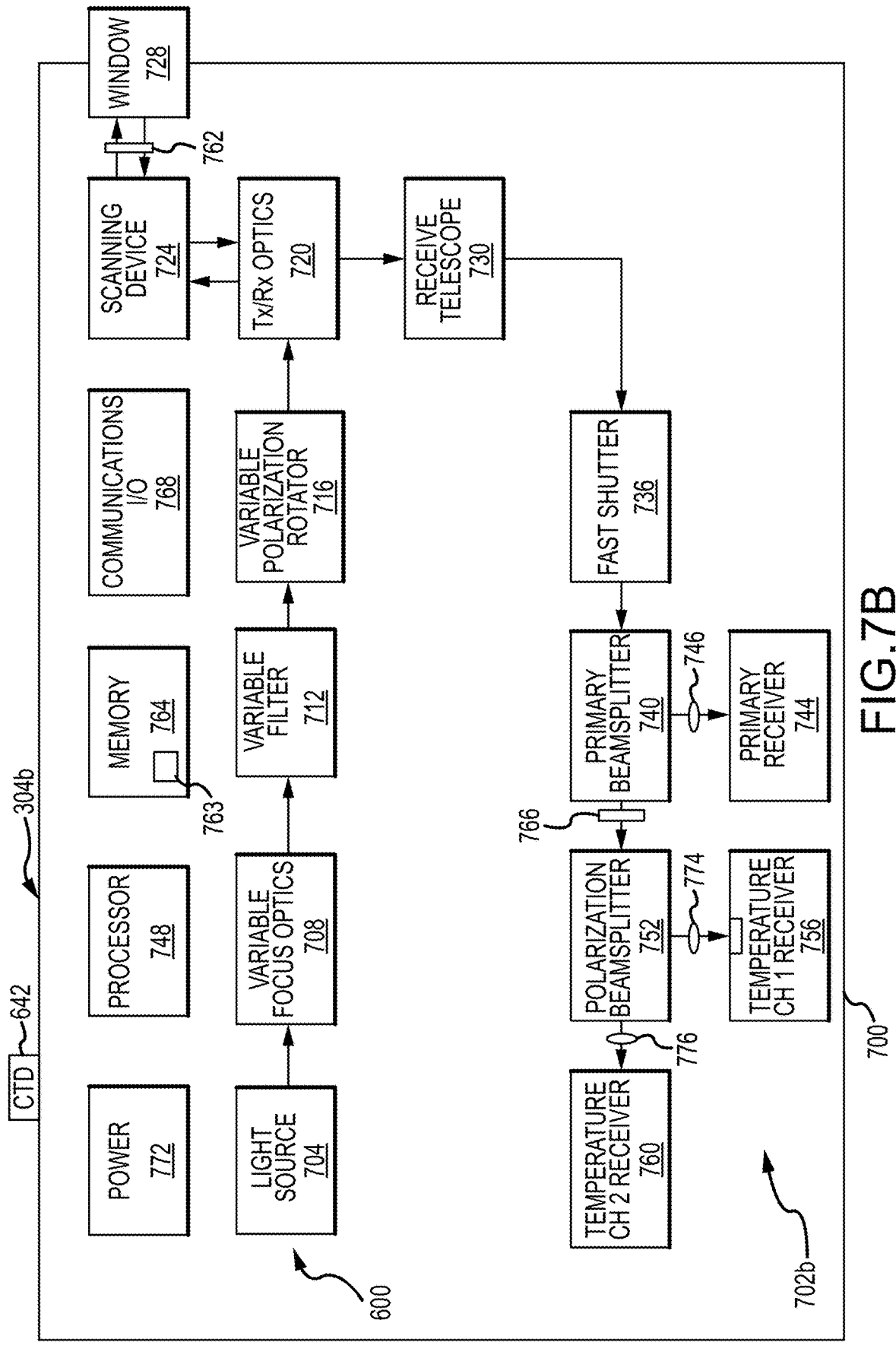

FIGS. 7A and 7B are block diagrams depicting components of monitoring systems 304 that may be contained within an underwater pressure vessel 700 or co-located with one another in accordance with embodiments of the present disclosure. The monitoring systems 304 of FIGS. 7A and 7B differ from one another in that the embodiment of the monitoring system 304a illustrated in FIG. 7A includes a temperature measuring sub-system 702a that compares a ratio of Raman wavelength amplitudes within a return signal to measure temperature, while the monitoring system 304b illustrated in FIG. 7B includes a temperature measuring sub-system 702b that calculates a ratio of light in the return signal based upon polarization to measure temperature. Otherwise, the monitoring systems 304a and 304b generally share components in common and can perform the same types of measurements. Accordingly, except where noted, the following description applies to both the embodiment of FIG. 7A and the embodiment of FIG. 7B.

The monitoring system 304 in accordance with embodiments of the present disclosure includes a lidar device 600 or other optical metrology system. As can be appreciated by one of skill in the art, a lidar device 600 is an active optical system that operates by transmitting light towards a target, receiving reflected light from the target, and determining the range to the target based upon time of flight information determined from the amount of time elapsed between the transmission of light from the light source and the time at which the reflected light or return signal is received at the receiver. As used herein, a target can include an area or feature on an underwater structure 204, including manmade structures and natural features or structures, 3-D targets 308 mounted to an underwater structure 204, and 2-D targets 312 applied to an underwater structure 204. In addition, the location of a point on the target from which light is reflected can be located relative to the lidar device 600 in three-dimensional space by combining the range information with the known azimuth and elevation information via scanner location (e.g. as an azimuth angle and an elevation angle) for scanning lidar devices 600, pixel location for multi-pixel lidar devices 600, or a combination of the two. The fourth dimension, time, is also recorded so measurements and features can be compared over time.

The components of the monitoring system 304 thus include a light source 704. The light produced by the light source 704 can be collimated or variably focused by optics 708. In accordance with at least some embodiments of the present disclosure, the light source 704 is a pulsed beam laser. As can be appreciated by one of skill in the art after consideration of the present disclosure, the light source 704 can produce light having a selected wavelength or range of wavelengths. As an example, but without limitation, the light source 704 may comprise a blue-green laser light source. As a further example, the light source 704 may have an output centered at 532 nm. Other wavelengths can also be used, for example to optimize performance in response to various water conditions. In accordance with still other embodiments, the light source 704 may produce non-collimated light. In accordance with still other embodiments, the light source 704 may be light emitting diode (LED) based, continuous wave (CW) laser based, modulated CW based, structured light, or some other light source.

The variable focus optics 708 can include traditional mechanical focusing elements, or non-mechanical elements, such as may be provided by fluid lenses, liquid crystal devices, electro-optic devices, and other optical elements. The ability to focus the beam can be used to optimize signal return for a specific target at a specific range for specific water conditions. The light can then be adjusted in magnitude by a variable filter or attenuator 712. This is advantageous for underwater sensing as the attenuation of seawater or other water bodies can vary dramatically, thus dramatically changing the return signal, which can strain the dynamic range of the receiver. One method for reducing the required dynamic range of the receiver is to adjust the light output power from the transmitter. This can be achieved by the variable attenuator 712. As examples, the variable attenuator 712 can include standard neutral density filters, other attenuation filters, or polarization elements.

The optical train can also include a variable polarization rotator 716. It is known that the polarization of the transmitted light can affect the backscatter power, which is a source of noise at the lidar device 600 receiver. Transmission range can therefore be optimized by adjusting the polarization rotation of the output light. In the monitoring system 304a of FIG. 7A, in which a ratio of the amplitude of different selected wavelengths within a return signal is used to measure temperature, the variable polarization rotator 716 can impart any polarization to the output light. In the monitoring system 304b of FIG. 7B, the variable polarization rotator 716, if included, can provide either a left hand circular or right hand circular polarization (in combination with quarter wave plate 762), as some type of circular polarization is needed in order to compare polarization ratios in a return signal for temperature measurement in that embodiment.

Transmit and receive (Tx/Rx) optics 720 are used to make the sensor monostatic. Monostatic sensors have the distinct advantage of simplified scanning as the transmitter and receiver are pointed at the same location with the same scanning mechanism, resulting in calibration and reliability performance that is superior to bistatic systems. A scanning device 724 can then be used to accurately direct the transmitted beam and the field of view of the receiver simultaneously to a scene through a window 728 in the enclosure 700. The scanning device 724 can include a steering mirror or other beam steering device, such as a micro-electro-mechanical system (MEMs), liquid crystal, acousto-optic, or electro-optic device, for precise control of the pointing of the light source and receiver toward a target, such as an underwater structure 204, and at known angles relative to the monitoring system 304.

Light reflected from the target is received by the scanning device 724 and is split by a beam splitter element included in the Tx/Rx optics 720. Light from the Tx/Rx optics 720 is provided to a receive telescope 730, which is configured to focus the received light so that it can be imaged onto the sensor elements of various receivers 744, 756, and/or 760 included in the monitoring system 304. In the monitoring system 304a that includes a wavelength based temperature measuring sub-system 702a, a variable polarization rotator 732 can be used to optimize the signal-to-noise ratio (SNR) of the return signal by selecting the optimal polarization for the hard target return. In the monitoring system 304b that includes a polarization based temperature measuring sub-system 702b, the variable polarization rotator 732 is omitted.

A fast shutter 736 is provided to block any stray light from the primary beam as it exits the window 728, after being directed by the scanning device 724. The fast shutter 736 is timed with high speed electronics, which may be implemented by a processor 748, to block the window 728 reflection from a transmitted pulse and then open quickly to capture returns from close targets. A beam splitter 740 splits off a portion of the return signal and directs it to the primary receiver 744. The beam splitter 740 may be in the form of a chromatic or achromatic beam splitter. For example, the beam splitter 740 may comprise a chromatic beam splitter that provides light at the primary wavelength output by the light source to the primary receiver 744, and that provides the remaining light to the temperature measuring sub-system 702. The primary receiver 744 is used for the range, vibration, and leak detection measurements made by the lidar system 600. The primary receiver 744 includes an optical sensor or detector, such as a photodiode, an avalanche photodiode, a photomultiplier tube, a silicon photomultiplier tube, a Geiger mode avalanche photodiode, charge coupled device (CCD) detector, complementary metal oxide semiconductor (CMOS) detector, or other optical detector. It can also include an electronic amplifier and/or thermal control elements and circuitry. In addition, the primary receiver 744 can include or be associated with a narrow band filter to reduce background light. A focusing optic 746 can be included to focus light from the beam splitter 740 onto the sensor of the primary receiver 744. In accordance with embodiments of the present disclosure, the primary receiver 744 may comprise a single or multiple pixel sensor. Information regarding the range to the target is monitored by a processor 748, which controls and/or has access to information regarding the time at which transmitted light is output, and the time at which a return signal, comprising transmitted light that has been reflected from a target, is received by the primary receiver 744. In addition, information from the scanning device 724, from a pan and tilt head 604, and/or the location of a receiving pixel in a lidar device 600 or camera 636 having a multiple pixel sensor can be used by the processor 748 to determine the azimuth angle and elevation angle to the target. This information can then be combined with timing information, and in particular the time at which the transmitted pulse of light produced by the light source 704 is sent towards the target, and the time that the return signal is received at the primary receiver 744. The range measurement determined from the timing information can then be applied to obtain a location of the target relative to the monitoring system 304. As can be appreciated by one of skill in the art after consideration of the present disclosure, the primary receiver 744 also provides information regarding the intensity of the return signal, which can be analyzed in connection with determining, for example, whether the return is from an underwater structure 204, water, or a plume of fluid. Moreover, the intensity may be provided from the sensor as a voltage signal.

The processor 748 can include any processor capable of performing or executing instructions encoded in system software or firmware 763 stored in data storage or memory 764, such as a general purpose programmable processor, controller, Application Specific Integrated Circuit (ASIC), Field Programmable Gate Array (FPGA), or the like. More-over, the execution of that software or firmware 763 can control the operation of the lidar system 600, including the acquisition of point cloud data that includes azimuth angle, elevation angle, intensity, and range information taken from an underwater scene. The execution of the software 763 by the processor 748 can be performed in conjunction with the memory 764, including the short or long-term storage of timing information, range information, point cloud data generated by the monitoring system 304, control point locations, or other control information or generated data. The memory 764 can comprise a solid-state memory, hard disk drive, a combination of memory devices, or the like. The monitoring system 304 can additionally include various sensors. For example, the monitoring system 304 can include a CTD device 642 for measuring the conductivity (and thus the salinity), the temperature, and the depth of the water at the location of the monitoring system 304. Because a CTD device 642 must be in direct contact with the surrounding water, it can be mounted outside of or adjacent an aperture in the enclosure 700.

As has been described in U.S. Pat. No. 4,123,160, the Raman return from water molecules can be used to deter-mine the temperature of the water. Typically, this requires a full spectrometer to analyze the spectrum of the Raman return. In accordance with embodiments of the present disclosure, temperature measurements are performed by comparing two spectral channels or two polarization chan-nels. Either of these approaches are allowed by a monitoring system 304 in accordance with embodiments of the present disclosure that incorporates a temperature measuring sub-system 702a or 702b, as described herein.

Moreover, the temperature measurement subsystem 702 can measure the temperature of water at a distance from the monitoring system 304. The temperature measurement sub-system generally includes a beam splitter 750 or 752 that divides the signal received from the primary beam splitter 740 into a first channel provided to a first temperature channel receiver 756 and a second channel that is provided to a second temperature channel receiver 760. First 774 and second 776 focusing optics can be included to focus light from the beam splitter 750 onto the respective temperature channel receivers 756 and 760.

In a monitoring system 304a that includes a temperature measurement sub-system 702a that uses different wave-lengths for temperature measurement (see FIG. 7A), the beam splitter 750 used to divide the return signal into two channels may comprise a chromatic or an achromatic beam splitter. A first one of the channels is passed through a first narrowband filter 754 before being provided to a first temperature channel receiver 756. A second one of the channels is passed through a second narrowband filter 758 before being provided to a second temperature channel receiver 760. The passband of the first narrowband filter 754 is selected to encompass a first Raman wavelength, while the passband of the second narrowband filter 758 is selected to encompass a second Raman wavelength. For example, where the transmitted light from the light source 704 has a wavelength of 532 nm, the first passband can be about 10 nm wide and can be centered at a wavelength of about 640 nm, and the second passband can be about 10 nm wide and can be centered at a wavelength of about 655 nm, where "about" is +/−10% of the stated value. The temperature channel receivers 756 and 760 are optical detectors. The temperature channel receivers 756 and 760 can thus include a photo-diode, CCD detector, CMOS detector, an avalanche photo-diode, a photomultiplier tube, a silicon photomultiplier tube, a Geiger mode avalanche photodiode, or other optical detec-tor. As a further example, the temperature channel receivers 756 and 760 can comprise single element or pixel sensors. The temperature channel receivers 756 and 760 can also include an electronic amplifier, thermal control elements and circuitry, focusing optics, or other components. As can be appreciated by one of skill in the art after consideration of the present disclosure, the ratio of the amplitude of the signal comprising the first Raman wavelength detected at the first temperature channel receiver 756 to the amplitude of the signal comprising the second Raman wavelength detected at the second temperature channel receiver 760 gives the temperature of the water at a selected range and angular location.

In a monitoring system 304b that includes a temperature measurement sub-system 702b that measures a ratio of differently polarized light for temperature measurement (see FIG. 7B), linearly polarized light from the light source 704 is passed through a first quarter wave plate 762, which can be located before or after the scanning device 724, to produce a circularly polarized output beam. A second quar-ter wave plate 766 converts circularly polarized light in the return signal to linearly polarized components. If the target reflection reverses the circular polarization, then a second quarter wave plate 766 is not needed. A polarization beam splitter 752 then divides the portion of the return signal received from the primary beam splitter 740 into two channels according to the polarization of the received light. A first one of the channels, comprising light of a first polarization (e.g. vertically polarized light), is provided to a first temperature channel receiver 756. A second one of the channels, comprising light of a second polarization (e.g. horizontally polarized light), that is opposite the polarization of the light in the first channel, is provided to a second temperature channel receiver 760. The temperature channel receivers 756 and 760 are optical detectors that receive one of the oppositely polarized signals. The temperature channel receivers 756 and 760 can thus include a photodiode, CCD detector, CMOS detector, an avalanche photodiode, a pho-tomultiplier tube, a silicon photomultiplier tube, a Geiger mode avalanche photodiode, or other optical detector. As a further example, the temperature channel receivers 756 and 760 can comprise single element or pixel sensors. The temperature channel receivers 756 and 760 can also include an electronic amplifier, thermal control elements and cir-cuitry, focusing optics, or other components. As can be appreciated by one of skill in the art after consideration of the present disclosure, the ratio of the amplitude of the signal from the light of the first polarization detected at the first temperature channel receiver 756 to the amplitude of the signal from the light of the second, opposite polarization detected at the second temperature channel receiver 760 gives the temperature of the water at a selected range and angular location.

A key advantage of a monitoring system 304 architecture in accordance with embodiments of the present disclosure is that the range and angle from the lidar device 600 of the monitoring system 304 to the target are known, so the thermal measurement can be optimized at particular points in space, thus improving the SNR for the thermal measurement and targeting the exact location of interest. For example, when the location (angle, angle, and range) of a pipe joint relative to the monitoring system 304 is known exactly, then a location within the water volume immediately adjacent (e.g. above) that exact location can be selected for the temperature measurement by pointing a lidar system 600 at the location. Furthermore, the return signal can be gated to only receive signal from a range corresponding to the selected location within the water, as opposed to the entire water path, thus improving the signal to noise ratio. This is not included in the prior art for thermal measurements. As another advantage, embodiments of the present disclosure provide for simultaneous or near simultaneous monitoring of movement and temperature of an underwater structure 204 using a single monitoring system 304.

As can be appreciated by one of skill in the art after consideration of the present disclosure, the basic components of the lidar system 600 are the light source 704 and the primary receiver 744. Embodiments of the present disclosure can include all of the components illustrated in FIGS. 7A and 7B, additional or alternate components, or a subset of these components. In accordance with embodiments of the present disclosure, the range and angle measurements should all be compensated using techniques described in U.S. Pat. Nos. 8,184,276 and 8,467,044. The memory 764 can be used for storing the location information, operating instructions, generated data, and the like. An input/output or communication interface 768 can be included for transmitting determined information to a monitoring and control station 804 (see FIG. 8) or other system or control center in real-time, near real-time, or asynchronously. A power source and distribution bus 772 can also be integrated with the monitoring system 304. Various elements of a monitoring system 304 as disclosed herein can be provided as or by discrete or integrated components. For example, the various receivers 744, 756, and 760 can be implemented as photosensitive detectors formed in the same semiconductor substrate. Moreover, optical elements, such as beam splitters 740, 750, and or 752 can be formed on a substrate that is bonded to the semiconductor substrate in which the photosensitive detectors are formed, creating an integrated chip or package.

Figure 8:
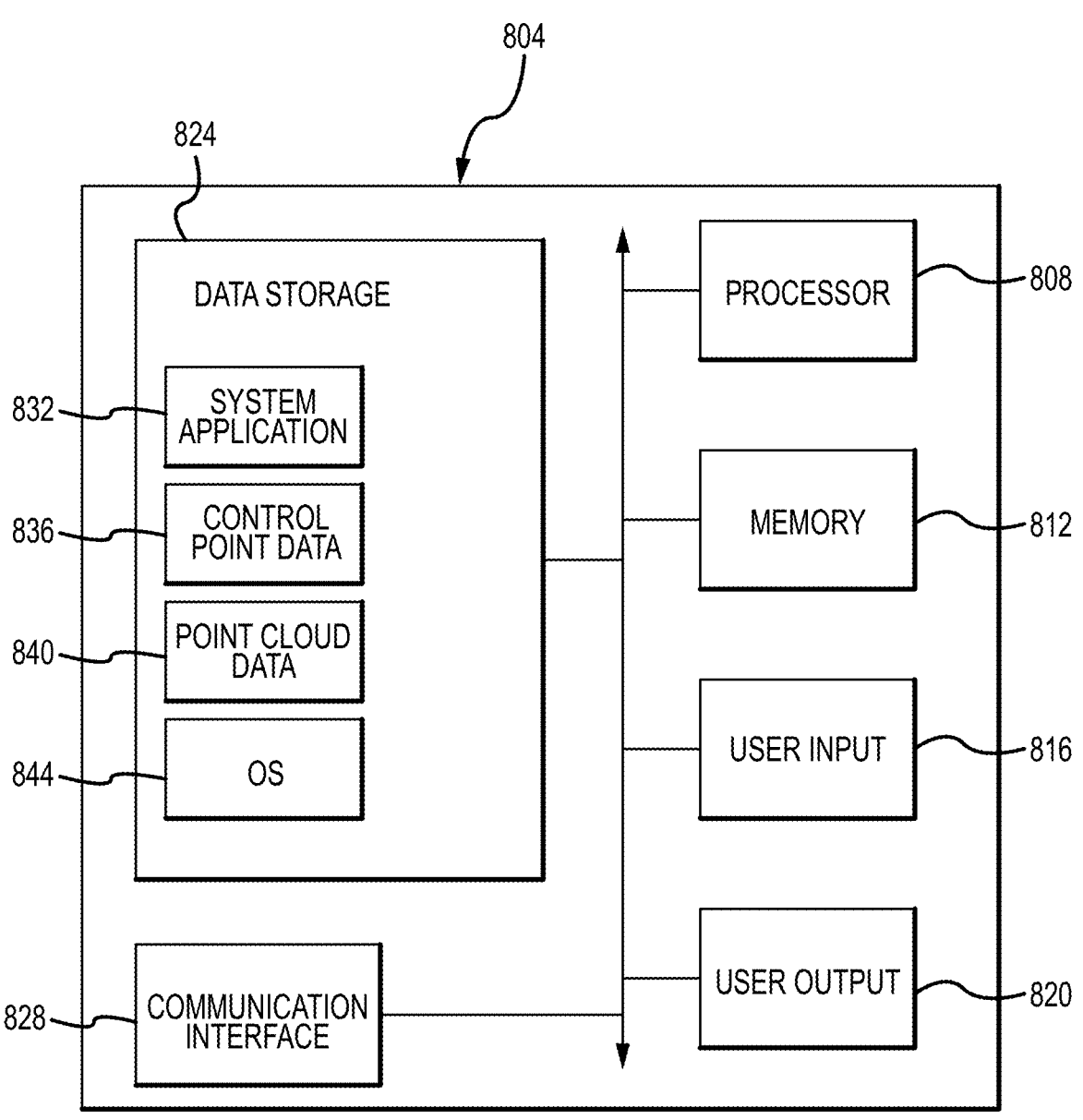
FIG. 8 is a block diagram depicting a monitoring and control station provided as part of a monitoring system in accordance with embodiments of the present disclosure.

FIG. 8 is a block diagram depicting human interface and other components included in a monitoring and control station 804 that can be provided as part of or in conjunction with a subsea monitoring system 304 in accordance with embodiments of the present disclosure. The monitoring and control station 804 can be provided as a top-side facility, carried by a mobile platform, such as a surface ship or a submersible vehicle, mounted to a fixed or stationary platform, such as a production platform, or located at an on-shore facility. The monitoring and control station 804 facilitates or performs functions that include providing output to and receiving input from a user or from an automated processing center. The monitoring and control station 804 generally includes a processor 808 and memory 812. In addition, the monitoring and control station 804 can include one or more user input devices 816 and one or more user output devices 820. The monitoring and control station 804 also generally includes data storage 824. In addition, a communication interface 828 can be provided, to support interconnection of the monitoring and control station 804 to the underwater components of the monitoring system 304, and/or to other systems. This interface can be used as a command and control interface of 804 to another autonomous device that provides the inputs and reads outputs that replaces human user interfaces 816 and 820.

The processor 808 may include a general purpose programmable processor or any other processor capable of performing or executing instructions encoded in software or firmware. In accordance with other embodiments of the present disclosure, the processor 808 may comprise a controller, FPGA, or ASIC capable of performing instructions encoded in logic circuits. The memory 812 may be used to store programs and/or data, for example in connection with the execution of code or instructions by the processor 808. As examples, the memory 812 may comprise RAM, SDRAM, or other solid-state memory. In general, a user input device 816 is included as part of the monitoring and control station 804 that allows a user to input commands, including commands that are transmitted to the underwater components of the monitoring system 304, to control that system 304. Examples of user input devices 816 that can be provided as part of the monitoring and control station 804 include a keyboard, keypad, microphone, biometric input device, touch screen, joy stick, mouse, or other position encoding device, or the like. A user output device 820 can, for example, include a display, speaker, indicator lamp, or the like. Moreover, a user input device 816 and a user output device 820 can be integrated, for example through a graphical user interface with a pointing device controlled cursor or a touchscreen display. Like the memory 812, the data storage 824 may comprise a solid-state device. Alternatively or in addition, the data storage 824 may comprise, but is not limited to, a hard disk drive, a tape drive, or other addressable storage device or set of devices. Moreover, the data storage 824 can be provided as an integral component of the monitoring and control station 804, or as an interconnected data storage device or system.

The data storage 824 may provide storage for a subsea monitoring system application 832 that operates to present a graphical user interface through the user output device 820, and that presents point cloud data, or data derived from point cloud data, obtained by one or more underwater monitoring systems 304. The application 832 can further operate to receive control commands from a user through the user input device 816, including commands selecting targets or other control points on an underwater structure 204. In accordance with embodiments of the present disclosure, the application 832 can perform various functions autonomously, such as identifying underwater structures 204, identifying features on underwater structures 204, identifying a centroid of an underwater structure 204 or a feature of an underwater structure 204, identifying control points on underwater structures 204, identifying target centroids, monitoring the motion, vibration, and/or temperature parameters of underwater structures 204, or other operations. Such automated operations can be implemented using, for example, image recognition techniques. The data storage 824 can additionally provide storage for the selected control points 836, for point cloud data 840 generated by operation of one or more monitoring systems 304, and for range, vibration, vibration mode, temperature, leak detection, or other measurements or data generated by a monitoring system 304. In accordance with still other embodiments of the present disclosure, the system application 832 can be executed to detect motion, vibration, vibration mode, temperature, changes, features, lack of features, other anomalies, or leaks instead of or in conjunction with execution of the system software 763 by the processor 748 of the monitoring system 304. The data storage 824 can also store operating system software 844, and other applications or data.

Figure 9:
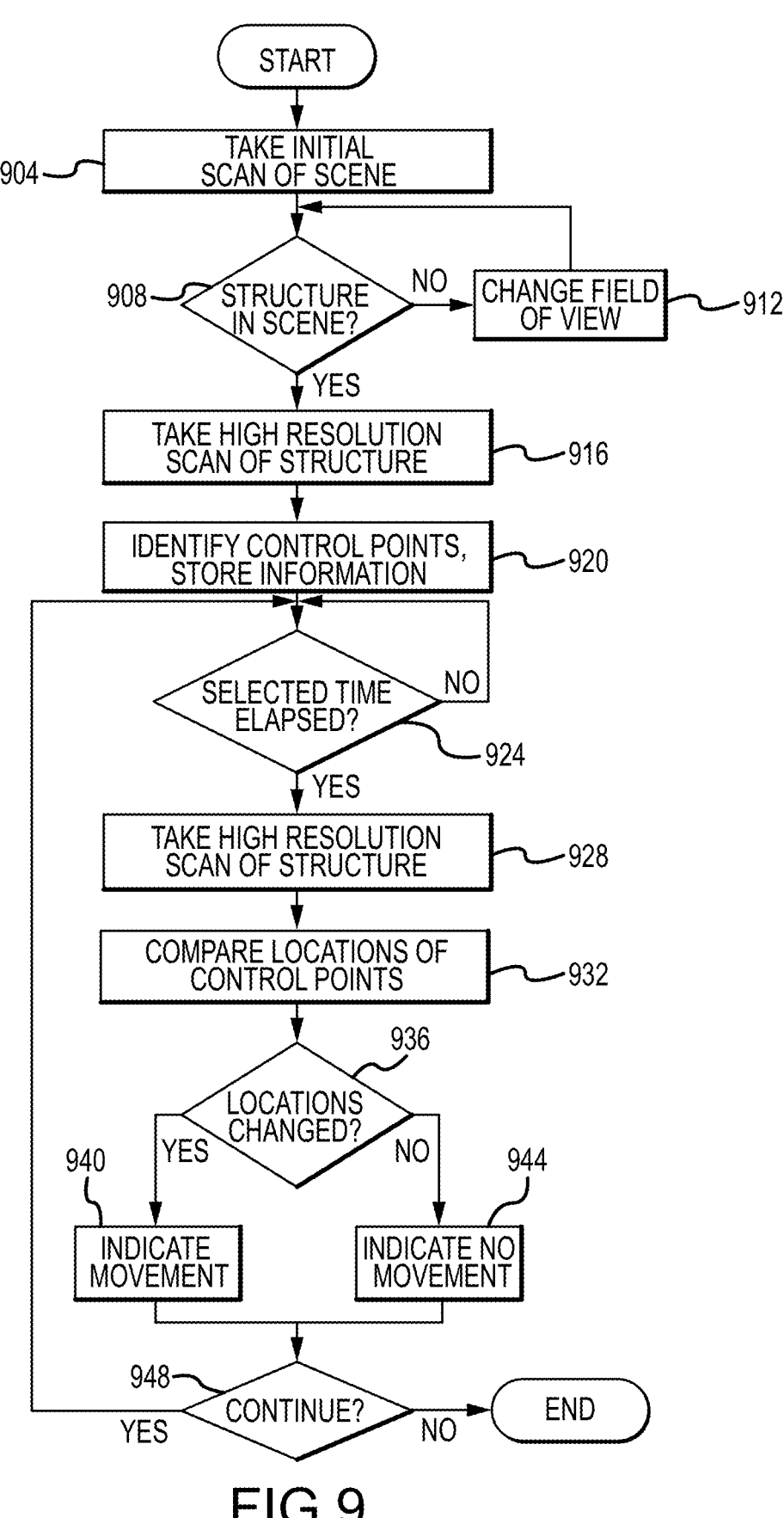
FIG. 9 is a flowchart depicting aspects of a process for detecting movement of an underwater structure in accordance with embodiments of the present disclosure.

FIG. 9 is a flowchart depicting aspects of a process in accordance with embodiments of the present disclosure for the detection of movement of an underwater structure 204. As a first step, an initial scan of an underwater scene is taken (step 904). In accordance with embodiments of the present disclosure, the initial scan is a three-dimensional scan obtained using one or more monitoring systems 304. In particular, and as can be appreciated by one of skill in the art after consideration of the present disclosure, taking a scan of an underwater scene includes operating a light source 704 to illuminate the scene, and receiving a return signal reflected from objects in the scene that is provided to a primary receiver 744. The initial scan can be a relatively low-resolution scan. In particular, only enough detail to determine whether a desired underwater structure 204 or portion of an underwater structure 204 is within the field of regard 328 of the monitoring system 304 is required. In general, the accuracy of a scan, including relatively low or relatively high-resolution scans, is greatest when the monitoring system 304 is statically mounted to a stationary platform. As a next level of accuracy, the monitoring system 304 can operate to scan a scene while it is mounted to a mobile platform or vehicle, such as an AUV/ROV, while that platform or vehicle is stationary on the seabed or some other structure. As a less accurate technique, but one that can still be viable, the monitoring system 304 can perform a scan while mounted to a floating or moving mobile platform or vehicle, such as an AUV/ROV.

Figure 10:
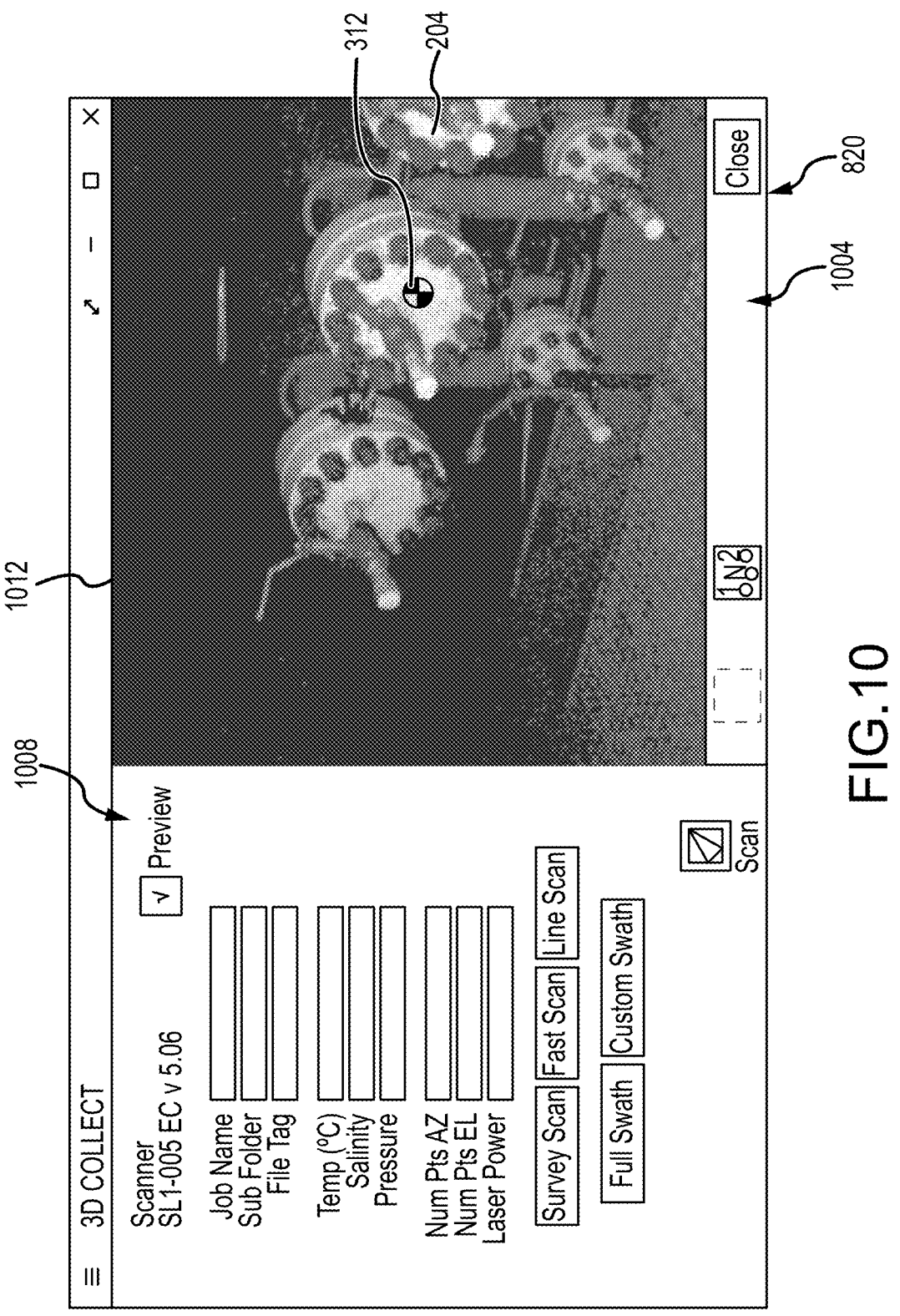
FIG. 10 depicts a user interface presented in connection with the operation of a system in accordance with embodiments of the present disclosure.

At step 908, a determination is made as to whether the underwater structure 204 of interest is included in the point cloud data obtained from the scene. In accordance with embodiments of the present disclosure this determination can be made in connection with presenting the image derived from the point cloud data to a user through a user output device 820 included as part of a monitoring and control station 804 in operative communication with the monitoring system 304. An example of a user interface 1004 presented to a user by a user output device 820 is depicted in FIG. 10. As shown, the user interface 1004 can include a user input section 1008 containing a variety of data entry fields and virtual buttons that can be utilized by a user to enter control instructions or data through manipulation of one or more user input devices 816. The user interface 1004 can additionally present an image of the underwater scene 1012 generated from the point cloud data obtained by the initial scan of the scene. The image can include point cloud data obtained from a single lidar device 600, or that has been stitched together from multiple lidar devices 600. Moreover, data can be obtained from lidar devices 600 or other optical devices included in different monitoring systems 304. Verification that the intended underwater structure 204 or portion of an underwater structure 204 is within the field of view of the monitoring system 304 can thus involve a manual operation, in which a user or operator makes such a determination by viewing the presented image 1012. As an alternative, the determination as to whether the intended underwater structure 204 is included in the scene can be performed through automated processes, such as through the execution of image recognition software included in or provided separately from the system application 832. If it is determined that the underwater structure 204 is not included in the point cloud data obtained, the field of view of the monitoring system 304 can be changed (step 912). Changing the field of view of the monitoring system 304 can include adjusting the field of regard of one or more lidar systems 600 via an associated pan and tilt head 604, through operation of the monitoring system 304 scanning device 724, or through repositioning the monitoring system 304 itself. In accordance with at least some embodiments of the present disclosure, changing the field of view of a lidar system 600 can be performed in response to controlling a pan and tilt head 604 or other mechanism while the current field of view is displayed to the user through the user output device 820 in real time or near real-time.

Figure 11:
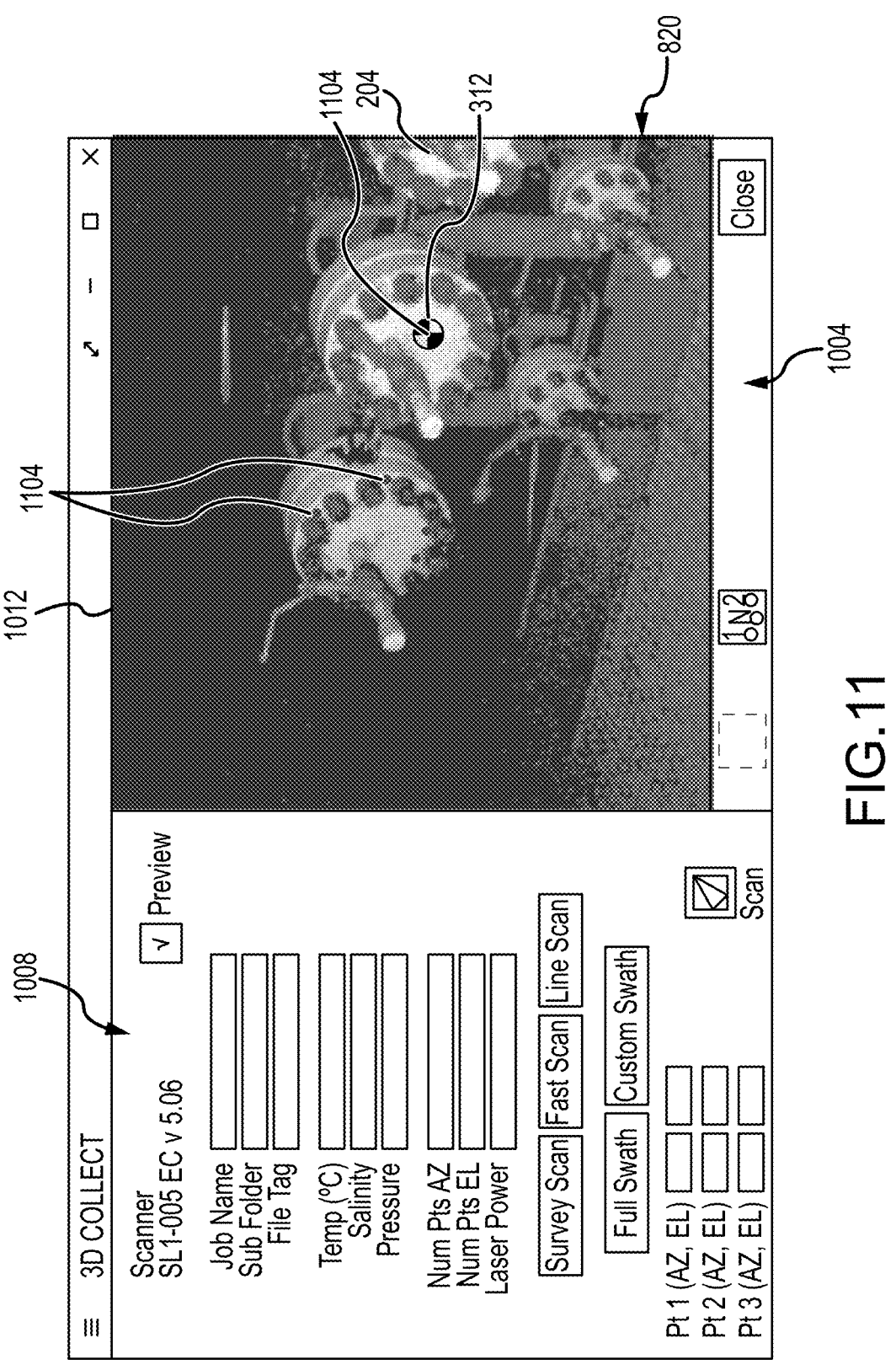
FIG. 11 depicts a point selection operating mode in connection with the user interface of FIG. 10.

After determining that the desired underwater structure 204 is within the imaged scene, a high resolution scan of the scene can be taken using the monitoring system 304 (step 916). The high resolution scan can be of an area within the initial scan that has been selected by a user through a user input device 816 provided as part of the monitoring and control station 804 in communication with the monitoring system in 304. One or more control points 1104 (see FIG. 11) can then be selected for monitoring, and information regarding the location of the selected control points 1104 in three-dimensional space can be stored in the data storage 824, memory 812, and/or memory 764 (step 920). The selection of the control points 1104 can be made through the interaction of a user with the monitoring system 304 via the user interface 1004. For example, the user can manipulate a cursor to select the locations of control points 1104 on a visualization of a 3-D scan of an underwater structure 204 presented to the user by the user output device 820 as an image 1012 using a pointing device provided as or part of a user input device 816 in a point and click operation. The control points 1104 can correspond to unique features on the underwater structure 204, the centroid of lidar targets 308 or 312, the centroid of the underwater structure, the centroid of selected areas of the underwater structure 204, or the like. In accordance with still other embodiments of the present disclosure, the control points 1104 can be selected through an automated process that identifies the centroid of the underwater structure 204, the centroid of features or components of the underwater structure 204, the edges of structural features, the centroid of mounted 3-D 308 or applied 2-D 312 targets, or points at a selected interval along an underwater structure 204. An automated process for selecting control points 1104 can operate in combination with a manual process, where a user selects an area or feature, and the automated process determines the precise location for the control points 1104. For instance, a user can select a target 308 or 312 or feature on an underwater structure 204, and the automated process can identify the centroid of the target or feature for use as the control point 1104 location. These control points 1104 can then be used as reference points for monitoring various parameters of the underwater structure 204, including but not limited to a shift in a location of the underwater structure 204.

Figure 12:
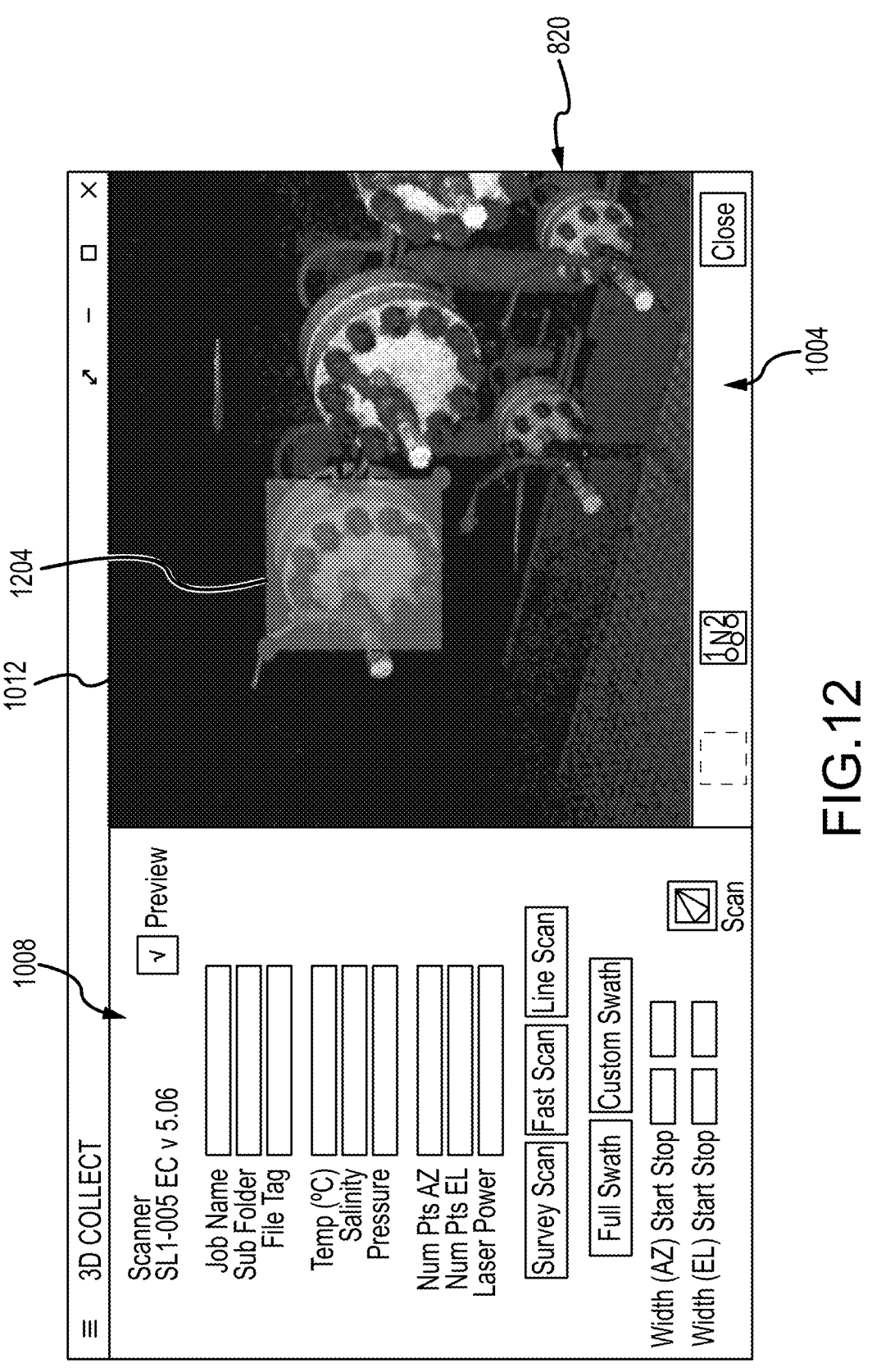
FIG. 12 depicts an area selection operating mode in connection with the user interface of FIG. 10.

In accordance with further embodiments of the present disclosure, the selection of control points 1104 can comprise the selection of an area of interest 1204 of an underwater structure 204 by a user through interaction with the user interface 1004 presented by execution of the application software 832 by the processor 808, the user input device 816, and the user output device 820. (see FIG. 12). The 3-D point cloud data from within the selected area of interest 1204 or a sampling of that data can then be stored as a reference surface, the location of which can be monitored. Moreover, specific locations within a selected area of interest can be identified by an automated process for use as control points. For instance, the centroid of a component of the underwater structure 204 within the selected area, the centroid of a target 308 or 312, or the edge of a feature within the selected area can be identified by the automated process and used as the location of control points, or control points can be defined by the automated process at intervals along a surface within the selected area. The location information from each of the selected control points can be stored as location points in 3-D space. The location can be an absolute location, or a location relative to a survey monument or other known location. For example, the location can be relative to the location of the monitoring system 304, and/or to one or more reference points that can be located by the monitoring system 304, such targets 308 or 312 provided on a monument 316 or on another underwater structure 204 within the field of view of the monitoring system 304.

At step 924, a determination is made as to whether a selected time has elapsed. If the selected time has not elapsed, the process can idle at step 924. In accordance with embodiments of the present disclosure, the selected time can be anywhere from a fraction of a second to seconds, minutes, hours, days, months, years, or any other time period. After it has been determined that the selected time has elapsed, an additional scan of the underwater structure 204 is taken using the monitoring system 304 (step 928). The locations of the selected control points 1104 in the point cloud data from the first or previous high resolution scan of the underwater structure 204 that have been stored are then compared to the locations of the selected control points 1104 in the point cloud data from the additional or subsequent high resolution scan of the underwater structure 204 (step 932). Moreover, embodiments of the present disclosure can include comparing the relative locations of a selected, unique pattern of multiple points 1104 to ensure that the same structural features are being compared between the different scans. In accordance with at least some embodiments of the present disclosure, the locations of control points 1104 can be stored as absolute locations, or relative to a monument 816, lidar system 304 location, other undersea structure 204, or the like.

If it is determined (step 936) that the locations of one or more of the control points 1104 has changed, an indication that the underwater structure 204 has moved is generated (step 940). Alternatively, if it is determined (step 936) that the locations of the control points 1104 have not changed, an indication that the underwater structure 204 has not moved is generated (step 944). The indications of movement or non-movement can be presented through a user interface 1004, provided as an output to another system, or stored.

A determination can next be made as to whether operation of the monitoring system 304 to detect movement of the underwater structure 204 is to continue (step 948). If operation is to continue, the process can return to step 924. The monitoring system 304 can thus be operated to periodically scan a scene to determine whether the location of one or more underwater structures 204 associated with selected control points 1104 has shifted or has otherwise moved. If a determination is made that operation is not to continue, the process can end.

Figure 13:
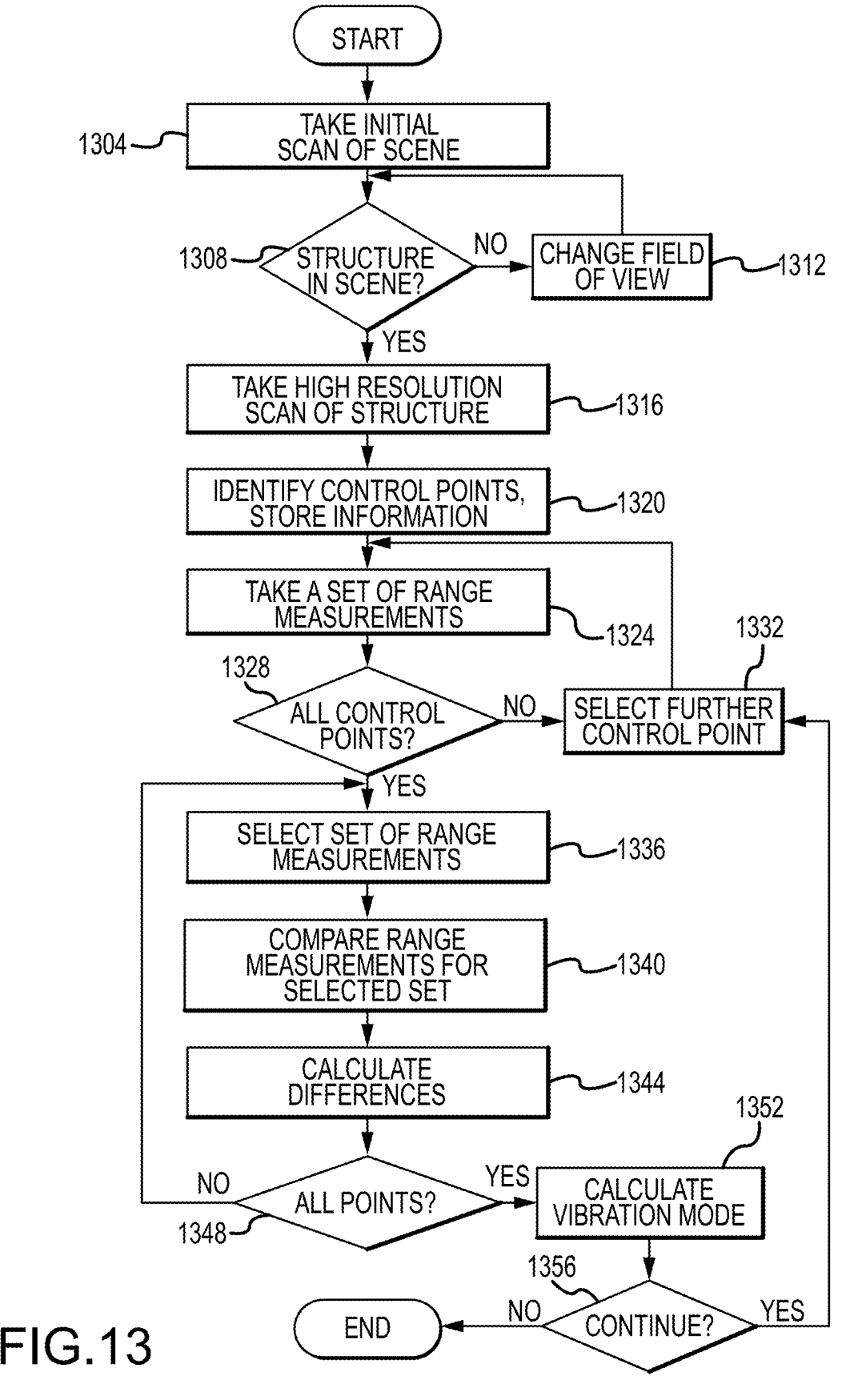
FIG. 13 is a flowchart depicting aspects of a process for detecting vibration of an underwater structure in accordance with embodiments of the present disclosure.

FIG. 13 is a flowchart depicting aspects of a process in accordance with embodiments of the present disclosure for the detection of vibration of an underwater structure 204.

Figure 14:
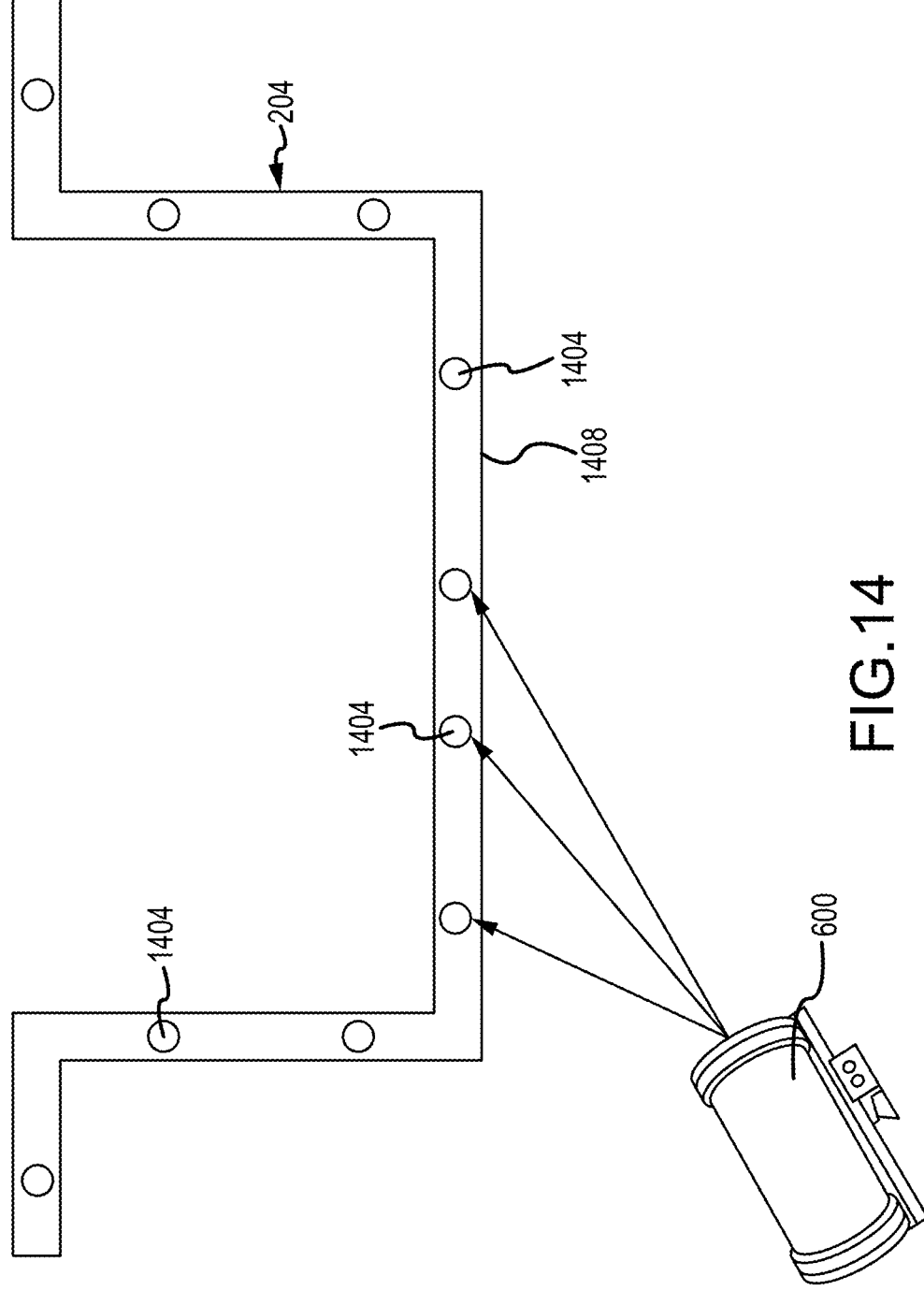
FIG. 14 depicts the selection of control points and the measurement of underwater structure vibration and vibration modes in accordance with embodiments of the present disclosure.

Initially, at steps 1304-1320, a process that is the same as or similar to the process described in connection with FIG. 9 is performed. Accordingly, an initial scan of an underwater scene is taken using a monitoring system 304 (step 1304), a manual or autonomous determination is made as to whether a desired underwater structure or portion of a structure 204 is within the scene (step 1308), and the field of view is changed if the desired underwater structure 204 is not within the field of view (step 1312). A high resolution scan of the structure is then taken (step 1316), and a set of one or more control points 1104 or 1404 (see FIG. 14) is identified and location information regarding those control points 1104 or 1404 is stored in data storage 824 or memory 764 or 812 (step 1320). In a second embodiment a high resolution scan is not needed in order to select the control points for a vibration measurement. In accordance with embodiments of the present disclosure, the set of control points 1104 or 1404 selected in connection with vibration monitoring of a particular underwater structure 204 can be located at intervals along that structure 204 or a portion of the structure. For example, but without limitation, a set of control points 1104 or 1404, may be defined along an underwater structure 204 comprising a section of pipe 1408 (see FIG. 14). As another example, control points 1104 can be selected across a reference surface of a structure (see FIG. 11). Moreover, where vibration monitoring is being performed concurrently with movement monitoring, the same control points 1104 can be used by both processes.

At step 1324, multiple range measurements are taken along a line, which may be defined as an azimuth angle and an elevation angle relative to the monitoring system 304 that intercepts a first one of the control points 1104 or 1404, at least at the time the location of the first control point 1404 was defined. In general, the set of multiple range measurements contains at least three such measurements, but usually tens to hundreds are taken. In one embodiment the time interval for the measurements is variable and can be selected. In another embodiment the time interval is fixed. The multiple range measurements are time stamped and stored.

A determination can then be made as to whether a set of range measurements for all of the control points 1104 or 1404 in the set of control points 1104 or 1404 have been obtained (step 1328). If not, a further control point 1404 is selected (step 1332), and the process returns to step 1324, at which multiple range measurements are taken along a line to the original location of the further control point 1404. These additional range measurements are then time stamped at step 1328. The collection of multiple range measurements with respect to different control points 1104 or 1404 can continue for each control point 1404 in the set. In accordance with embodiments of the present disclosure, the multiple range measurements for the different control points 1104 or 1404 are completed within a relatively short time span, such that a coherent plot of a movement of the underwater structure 204 can be provided from multiple range measurements for the different control points 1104 or 1404.

Figure 15:
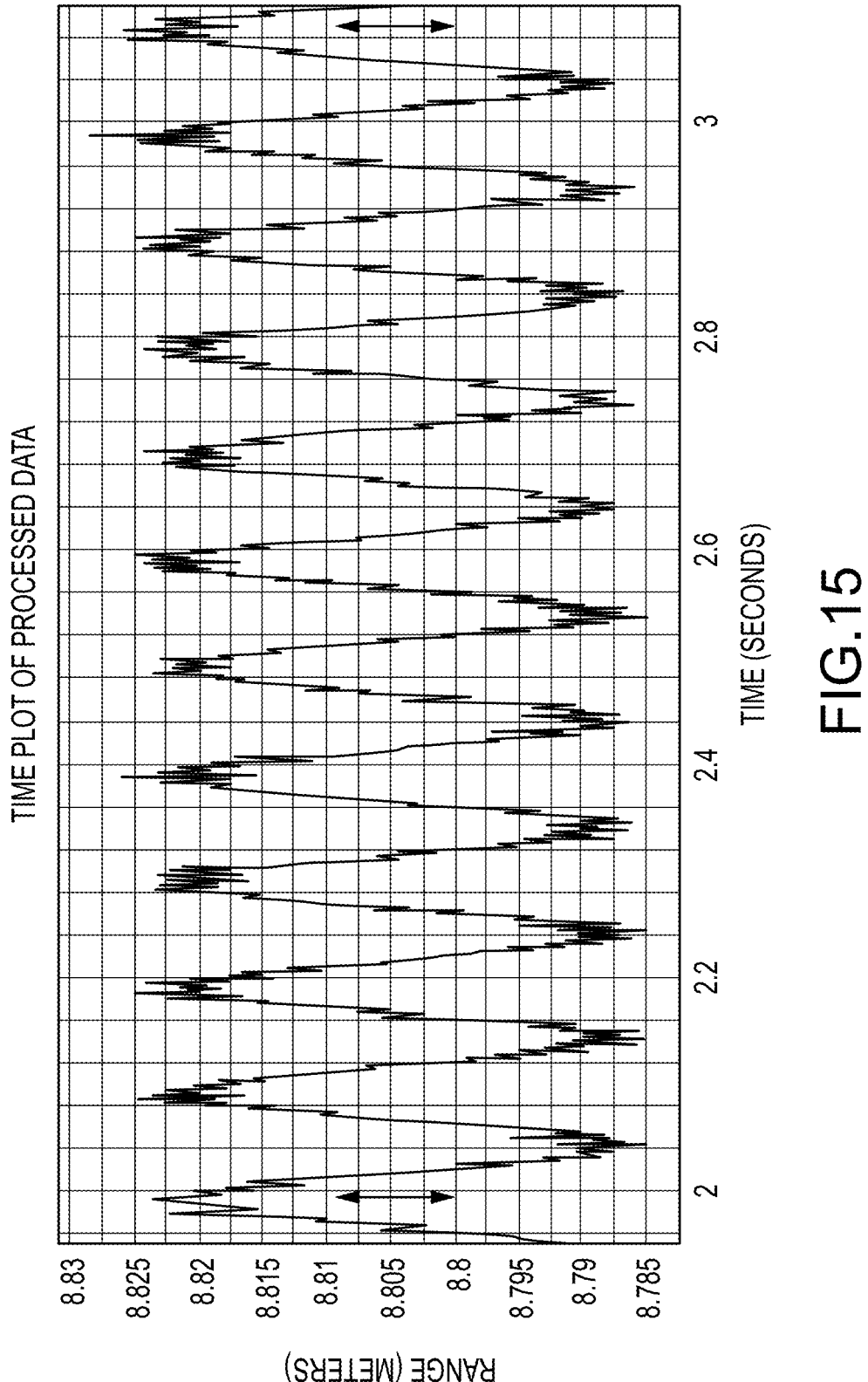
FIG. 15 depicts exemplary data obtained by a monitoring system in accordance with embodiments of the present disclosure.
Figure 16:
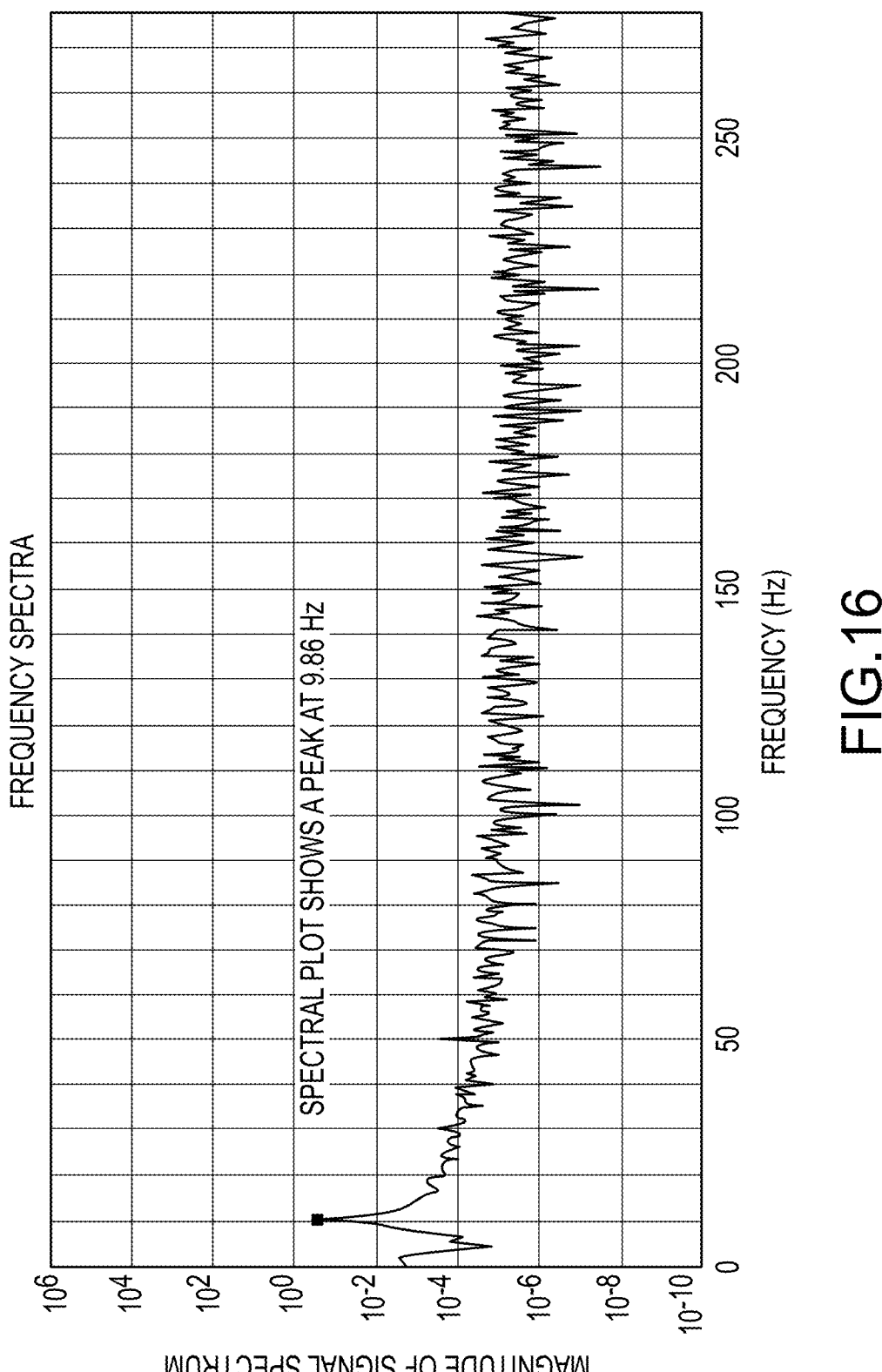
FIG. 16 depicts a Fourier transform of the data obtained by a monitoring system in accordance with embodiments of the present disclosure depicted in FIG. 15.

At step 1336, the range measurement data within a set obtained for a first control point 1404 is selected. The range measurements within that set are then compared to one another (step 1340). The magnitude of any differences in measured range at different times, which corresponds to the magnitude of motion of the underwater structure 204 along the line from the lidar device 600 to the original location of the control point 1404 on the underwater structure 204 over the time interval between adjacent measurements, can then be calculated (step 1344). Moreover, such movement can be plotted over time, as shown in FIG. 15, and a frequency of vibration can be calculated from the frequency spectra, as shown in FIG. 16. In the example of FIGS. 15 and 16, the collected data indicates a spectral peak, and thus a vibration of the underwater structure 204 at or near the selected control point, of 9.86 Hz. A determination is then made as to whether range measurement data for all of the control points 1104 or 1404 has been analyzed (step 1348). If range measurement data for all of the control points 1104 or 1404 has not been analyzed, the process can return to step 1336, and measurement data from a next control point can be collected. If range measurement data for all of the control points 1104 or 1404 has been analyzed, any vibration or other movement detected with respect to the individual control points 1104 or 1404 can be compared to the other control points 1104 or 1404, and a vibration mode of the underwater structure or portion of the underwater structure 204 associated with the control points 1104 or 1404 can be calculated (step 1352). In accordance with embodiments of the present disclosure, a visualization of the point cloud data of the structure, including the control points at which comparisons or other measurements are made, can be presented to a user, together with information regarding the frequency and magnitude of the vibration of the structure, through a user output device 820.

A determination can then be made as to whether the vibration monitoring process should continue (step 1356). If operation is to continue, the process can return to step 1332, and a control point (e.g. the first selected control point) can be selected, and range measurements can be taken along a line corresponding to that control point 1404, at least at the time that next control point 1404 was selected. Alternatively, the process can end.

As can be appreciated by one of skill in the art after consideration of the present disclosure, vibration monitoring of points on an underwater structure 204 can be performed with respect to a single control point 1104 or 1404, or multiple control points 1104 or 1404. Moreover, where multiple control points 1104 or 1404 are monitored at about the same time (e.g. sets of range measurements for control points 1104 or 1404 within a set of control points 1104 or 1404 are taken sequentially), information regarding the mode of vibration along the underwater structure or portion of the underwater structure 204 associated with the control points 1104 or 1404 can be obtained. In addition, the monitoring of an underwater structure 204 for movement can encompass monitoring the underwater structure 204 for vibration. For instance, the average range obtained from a set of range measurements made to a selected control point 1104 or 1404 can be compared to the range obtained from a set of range measurements made to that selected control point 1104 or 1404 at another time to determine whether the associated structure 204 has moved. Accordingly, the processes of monitoring for movement and monitoring for vibration using a lidar device 600 included in a monitoring system 304 in accordance with embodiments of the present disclosure can be performed simultaneously or nearly simultaneously (e.g. within several seconds of one another). Although the process for monitoring vibration has been described as including operations that are performed in a particular sequence, it should be appreciated that various operations can be performed simultaneously or in parallel. For example, determinations of whether control points have moved or are vibrating can be made while data regarding the range to those or other control points is being generated. It is appreciated by one skilled in the art that the vibration measurement is only in the direction parallel to the line of site of the monitoring device 304. Rapid movement in a perpendicular direction may not be captured by the range measurements, therefore a second monitor device 304 should monitor from a perpendicular direction, or the same monitoring device should be moved to make this measurement. In accordance with at least some embodiments of the present disclosure, the range and angle measurements should all be compensated using techniques described in U.S. Pat. Nos. 8,184,276 and 8,467,044.

Figure 17:
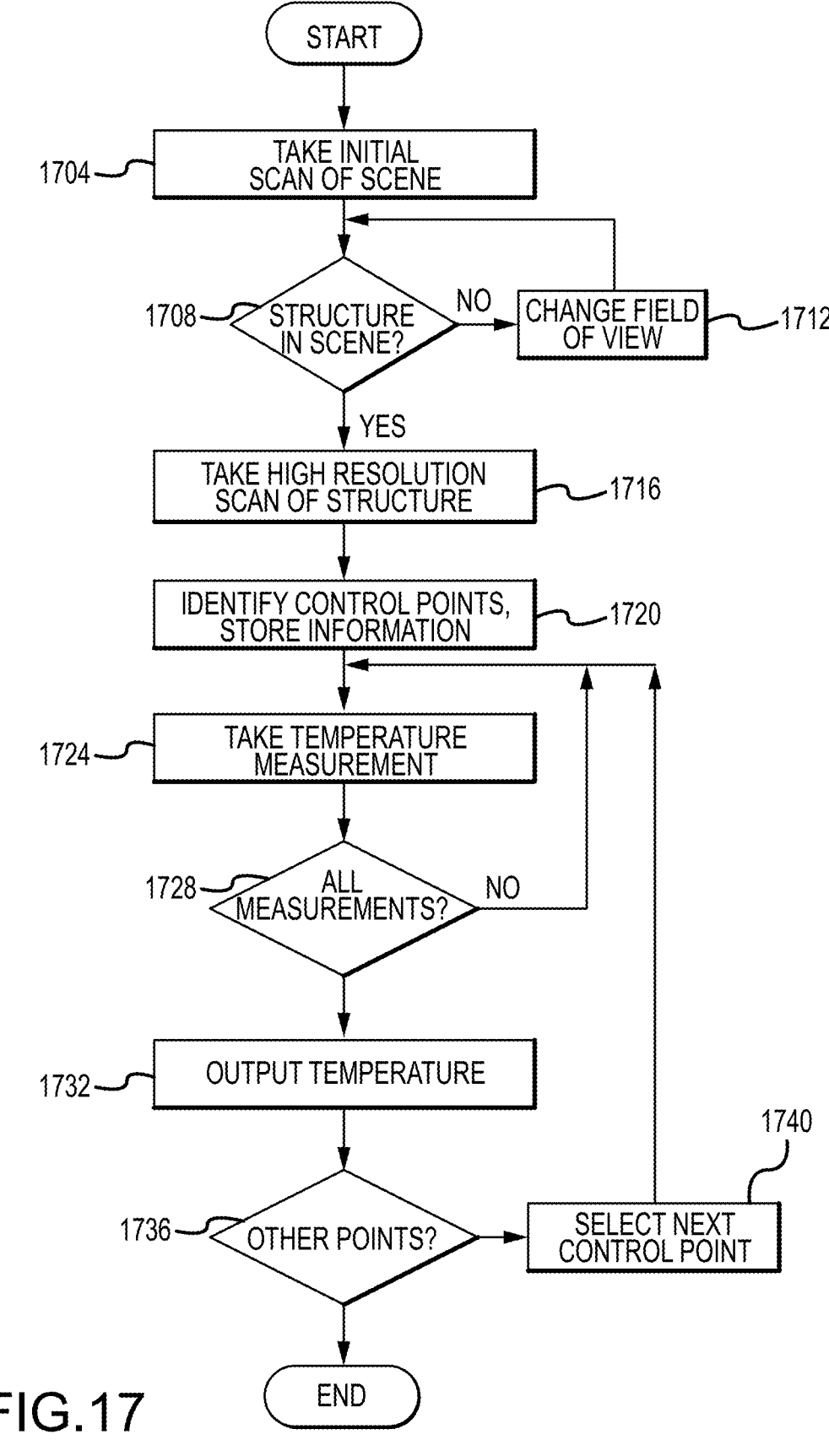
FIG. 17 is a flowchart depicting aspects of a process for the detection of the temperature of an underwater structure in accordance with embodiments of the present disclosure.

With reference now to FIG. 17, aspects of a process for the detection of the temperature of an underwater structure 204 in accordance with embodiments of the present disclosure are depicted. Initially, at steps 1704-1720, a process that is the same as or similar to the processes described in connection with FIGS. 9 and 13 is performed. Accordingly, an initial scan of an underwater scene is taken using a monitoring system 304 (step 1704), a manual or autonomous determination is made as to whether a desired underwater structure or portion of a structure 204 is within the scene (step 1708), and the field of view is changed if the desired underwater structure 204 is not within the field of view (step 1712). A high-resolution scan of the structure is taken once it is determined that the underwater structure 204 is within the field of view (step 1716), and a control point or set of control points 1104 or 1404 is identified, with location information regarding those control points 1104 or 1404 being stored in data storage 824 or memory 764 or 812 (step 1720). In a second embodiment a high resolution scan is not needed in order to select the control points for a temperature measurement. In accordance with embodiments of the present disclosure, the control point or set of control points used in connection with measuring the temperature of an underwater structure 204 can be the same as the control points used for movement or vibration monitoring. As another example, the control points used for measuring temperature can be located at intervals along the underwater structure 204. As yet another example, the control points can be at a selected point or points on the structure 204, for instance at locations where the temperature of the structure 204 is representative of the temperature of the structure generally, or where temperature monitoring is particularly important.

At step 1724, a temperature measurement is taken at a location adjacent to a first one of the control points. In particular, because the temperature monitoring sub-systems 702 of embodiments of the present disclosure utilize techniques that measure the temperature of water, the lidar device 600 of the monitoring system 304 is controlled to direct transmitted light towards and to receive a return signal from a volume of water immediately above or next to the selected control point on the underwater structure 204. Accordingly, the monitoring system 304 uses information on the azimuth angle, elevation angle, and range from the lidar device 600 to the control point, to determine the azimuth angle, elevation angle, and range at which to take the temperature measurement. For example, where a selected control point is located on an underwater structure 204 in the form of a pipe having a diameter of 250 mm, the lidar device 600 can be controlled so that a temperature measurement is taken from an azimuth angle that is the same as the azimuth angle to the control point, the elevation angle is increased as compared to the elevation angle to the control point, such that the temperature measurement point is between 5-25 mm above the underwater structure 204, and the range is the same as the range to the selected control point, plus 125 mm (i.e. half the diameter of the underwater structure 204 at the control point). The signal returned to the lidar device 600 is passed to the temperature channel receivers 756 and 760, which measure the amplitudes of the different wavelengths for the wavelength based temperature measurement sub-system 702*a*, or the amplitudes of the light of opposite polarizations for the polarization based temperature measurement sub-system 702*b*. The ratio of the different signals is then used to calculate the temperature of the water immediately adjacent the selected control point on the underwater structure 204, which can in turn be correlated to a temperature of the underwater structure 204 itself. In another embodiment a fixed range is used for the temperature collection range. This can be useful for collecting data while mounted on a moving platform. The height of the platform where the monitoring system 304 is mounted can be fixed above a structure, for instance a pipe, or the seabed. As the platform moves, the temperature is measured at a constant range from the sensor, or alternately multiple ranges from the sensor.

A determination is then made as to whether a selected number of temperature measurements relative to the selected control point have been made (step 1728). In general, a number of temperature measurements from the same location are made and averaged, to increase the accuracy of the measurement. For example, but without limitation, 1000 measurements can be made sequentially over a short period of time. After the selected number of temperature measurements have been made, an average of the determined temperature values obtained from the number of temperature measurements can be output to a user through an output device 820, transmitted to another system, and/or stored (step 1732).

At step 1736, a determination can be made as to whether a temperature of an underwater structure 204 adjacent other control points should be determined. If so, the process can select the next control point (step 1740), and the process can return to step 1724. If it is determined at step 1736 that no other control points 1104 or 1404 in a set remain for temperature determination, the process may end.

As can be appreciated by one of skill in the art after consideration of the present disclosure, the determination of the temperature of an underwater structure 204 adjacent a control point 1104 or 1404 can be performed as part of performing a scan of an underwater scene using a monitoring system 304 that incorporates a temperature measurement sub-system 702 as described herein. The processes of measuring temperature and vibration in accordance with embodiments of the present disclosure are similar, in that they both can include taking a series of measurements at a constant azimuth angle and a constant elevation angle relative to the monitoring system 304. Accordingly, embodiments of the present disclosure can be characterized by operating a lidar device 600 such that it dwells at a particular angular location until a selected number of measurements have been made, or until a series of range measurements have been made over a selected period of time. In accordance with further embodiments of the present disclosure, the monitoring system 304 can be operated in a calibration mode, in which a temperature measurement taken by the temperature measurement sub-system 702 of the monitoring system 304 at close range is calibrated by comparing that temperature to a temperature detected by a conventional temperature sensor, such as may be included as part of a CTD device 642, included as part of the monitoring system 304.

Alternatively or in addition, the monitoring system 304 can be directed to take a temperature measurement using the temperature measurement sub-system 702 from the vicinity of a temperature sensor carried by another monitoring system 304, a vehicle 324, or other known temperature location. Moreover, a CTD device 642 can provide a baseline for temp and salinity. The Raman spectral return and the depolarization ratio are both known to also have a dependence upon salinity, which adds uncertainty to the temperature measurement. By measuring temperature and salinity at a known location in the water and comparing the lidar returns near that same location, the remote temperature sensor can be calibrated for an absolute measurement. The temperature measured by the monitoring system 304 at the point of interest can then be compared to this known temperature to provide an absolute delta. In accordance with further embodiments of the present disclosure, background or ambient light can be subtracted to improve the signal to noise performance.

Figure 18:
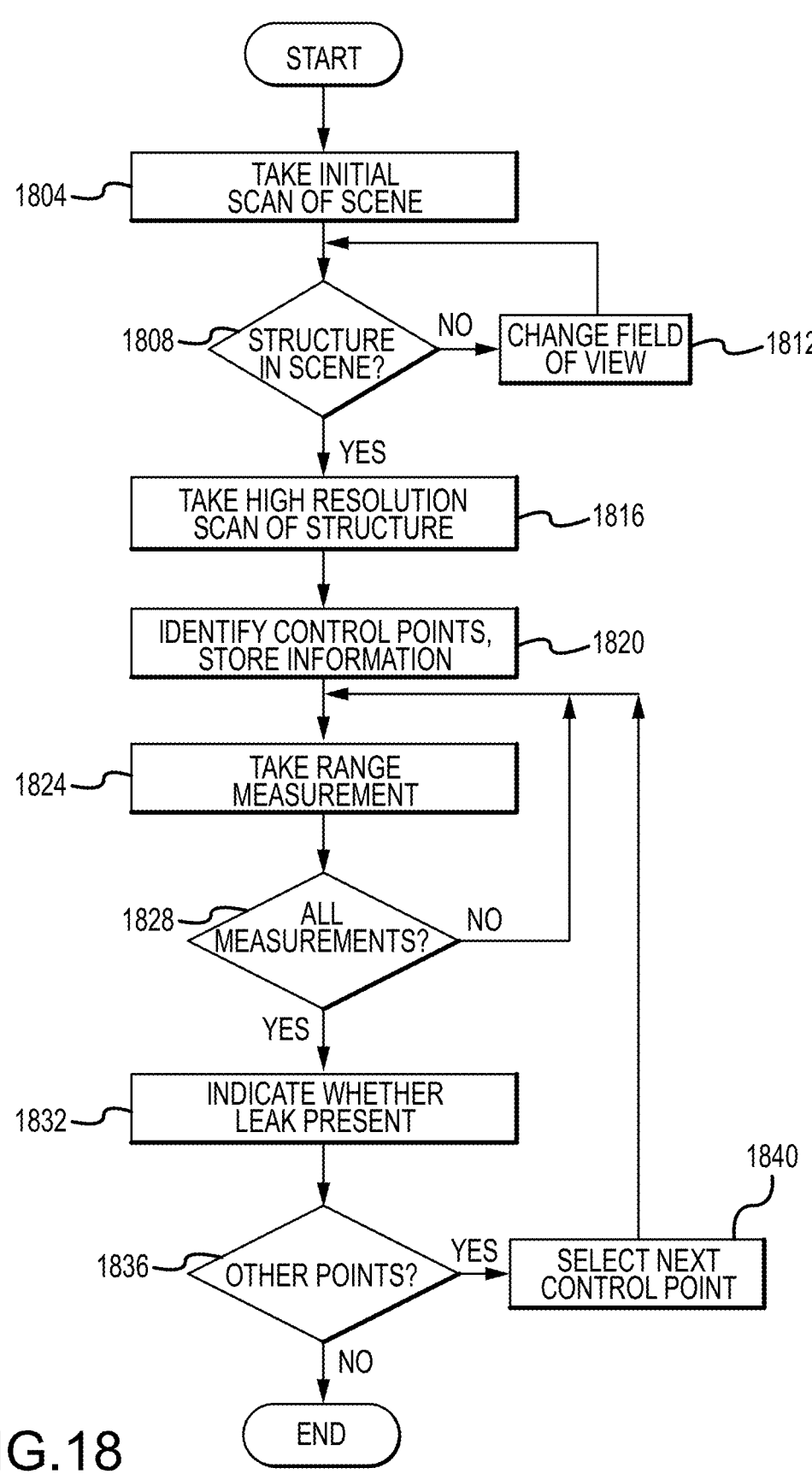
FIG. 18 is a flowchart depicting aspects of a process for the detection of leaks from an underwater structure in accordance with embodiments of the present disclosure.

With reference now to FIG. 18, aspects of a process in accordance with embodiments of the present disclosure for the detection of leaks from an underwater structure are depicted. Initially, at steps 1804-1820, a process that is the same as or similar to the processes described in connection with FIGS. 9, 13, and 17 is performed. Accordingly, an initial scan of an underwater scene is taken using a monitoring system 304 (step 1804), a manual or autonomous determination is made as to whether a desired underwater structure or portion of a structure 204 is within the scene (step 1808), and the field of view is changed if the desired underwater structure 204 is not within the field of view (step 1812). A high-resolution scan of the structure is then taken (step 1816), a control point or set of control points 1104 or 1404 is identified, with location information regarding those control points 1104 or 1404 being stored in data storage 824 or memory 764 or 812 (step 1820). In accordance with embodiments of the present disclosure, the control point or set of control points 1104 or 1404 in connection with leak monitoring concerning a particular underwater structure 204 are located at intervals along that structure 204 or a portion of the structure, or at a particular point or points on the structure 204 where there is a possibility of leaks, such as along or in areas in which pipes, conduits, tanks, pumps, or other fluid containing structures are located.

At step 1824, the lidar measurement system 304 is controlled so that a return signal is obtained from an area adjacent a selected control point or area. For example, a return signal can be received from a direction corresponding to or off-axis from a first one of the control points 1104 or 1404, to obtain a measurement in the area immediately above the selected control point. Thus, as for a temperature measurement, the lidar device 600 can be controlled to obtain returns near, but not on, the underwater structure 204. The intensity of the return signal as received at the primary receiver 744 can be used in connection with the leak detection process.

Figure 19:
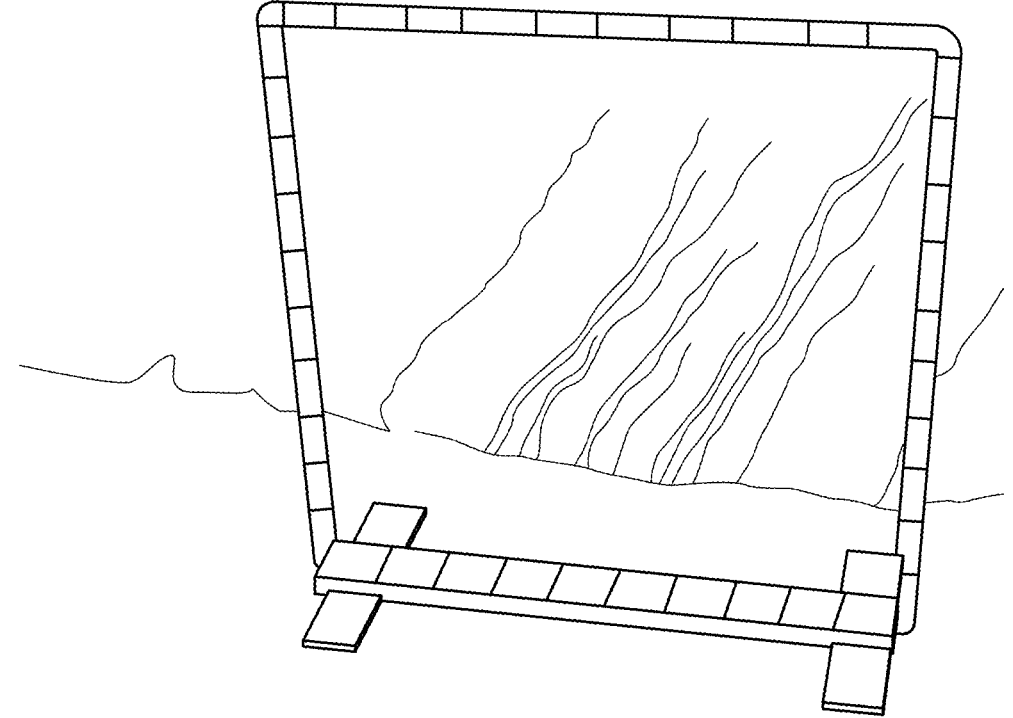
FIG. 19 illustrates an example of sea floor deformation due to well overpressure.

A determination is then made as to whether a selected number of range measurements relative to the selected control point have been made (step 1828). In general, a leak is indicated by a plume of liquid or gas bubbles having a density that is different than the underwater structure 204 or the surrounding water. This appears as a return having a different amplitude than the water or the underwater structure 204, and can be identified in the point cloud data obtained from a high resolution scan of an area by, for example, an automated process implemented by application software 763 or 832, or by a user monitoring a visualization of the point cloud data generated by the software and presented by a user output device 820, as depicted in FIG. 19, where the underwater structure 204 is an area of the seafloor. In accordance with embodiments of the present disclosure, the returns obtained while the monitoring system 304 is dwelling at and collecting returns from a particular azimuth and elevation angle for a specific range or range interval for purposes of temperature measurement can be used for the simultaneous detection of leaks. In particular, the portion of the return directed to the temperature measurement sub-system 702 by the primary beam splitter 740 can be used to measure temperature at the same time the portion of the return directed to the primary receiver 744 by the beam splitter 740 is used to detect leaks. After the selected number of range measurements from an area adjacent the underwater structure 204 have been made, an indication as to whether leak has been detected can be output to a user through an output device 820, transmitted to another system, and/or stored (step 1832).

At step 1836, a determination can be made as to whether leak detection relative to an underwater structure 204 adjacent other control points should be performed. If so, the process can select the next control point (step 1840), and the process can return to step 1824. If it is determined at step 1836 that no other control points 1104 or 1404 in a set remain for leak detection, the process may end.

In another embodiment of the invention, a high-resolution scan or alternately a low-resolution scan is taken of an area. In general, a leak is indicated by a plume of liquid or gas bubbles having a density that is different than the underwater structure 204 or the surrounding water. This appears as a different return having a different amplitude than the water or the underwater structure 204, and can be identified in the point cloud data. Therefore, the point cloud from a low, medium, or high-resolution scan can be analyzed for plume detection, thus indicating a leak. The plume can then be analyzed to locate a leak source and higher resolution scans can then be made of a specific leaking structure. The leak detection system can be mounted on a static platform like a stationary ROV, tripod, or subsea frame 624. Alternately, the point cloud data can be collected from a moving platform such as a moving ROV, AUV, or surface vessel (for shallow water deployments). The point cloud from either of these collection methods can be analyzed for leaks.

As can be appreciated by one of skill in the art after consideration of the present disclosure, the detection of leaks from an underwater structure 204 adjacent a control point 1104 or 1404 can be performed as part of performing a scan of an underwater scene using a monitoring system 304. Moreover, the scan can also be used in connection with performing movement, vibration, and/or temperature measurements as described herein. It should also be apparent that various measurements can be made by operating a monitoring system 304 such that it dwells at a selected azimuth angle and elevation angle and takes a series of range measurements. Moreover, a series of range measurements can be used to detect movement and vibration of an underwater structure 204. Where the monitoring system 304 includes a temperature monitoring sub-system 702, the monitoring system can simultaneously determine the temperature of water adjacent an underwater structure 204, and detect leaks from that structure 204.

In an example use scenario, a user at a monitoring and control station 804 directs a monitoring system 304 to image an underwater scene in 3-D using a lidar device 600, or to take an image of the scene in 2-D using a camera 636, or both. The user than selects control points 1104 or 1404 on an underwater structure 204 within the imaged scene. Control points can also be selected through automated process, such as image recognition process, that identify the centroid of the underwater structure 204 or components of that structure, or that identify particular features of the underwater structure 204. The locations of these control points 1104 or 1404 are recorded as points in 3-D space. The monitoring system 304 takes a series of range measurements for each control point 1104 or 1404. More particularly, for vibration monitoring, a series of range measurements are taken for a first control point along the azimuth angle and elevation angle for that control point at least at the time the control point 1104 or 1404 was defined. Any differences in the ranges determined within the series of ranges can be applied to determine the amplitude and frequency of the vibration thus indicated. The monitoring system 304 can control the included scanning device 724 so that a series of range measurements can be taken along the azimuth angle and elevation angle associated with a next control point 1104 or 1404. A vibration mode for the underwater structure 204 can be calculated from an aggregation of the measurements taken from multiple control points 1104 or 1404 on the structure 204 within a suitably short period of time.

Continuing the example use scenario, for location monitoring, the locations of the defined control points 1104 or 1404 can be periodically determined from point cloud data encompassing the control points 1104 or 1404. More particularly, the point cloud data can be analyzed by automated processes, implemented by the execution of software 763 by the processor 748, and/or the execution of software 832 by processor 808, to identify the centroid of the underwater structure 204 or a component thereof, a unique contour or other feature on the underwater structure 204, or the location of the center of a lidar target 308 or 312 corresponding to the control point 1104 or 1404. A determination can then be made as to whether the azimuth angle, elevation angle, or range to the control point 1104 or 1404 has changed over time. In accordance with at least some embodiments of the present disclosure, the relative locations of multiple control points 1104 or 1404 as determined during a prior scan can be compared to their relative locations during a subsequent scan to detect movement and to verify the identity of a particular control point 1104 or 1404.

Still continuing the example use scenario, the temperature of water immediately adjacent or near the underwater structure 204 can be measured by operating the lidar device 600 or the monitoring system 304 to measure the ratio of the return intensity of different wavelength or different polarization returns at an azimuth angle, elevation angle, and range corresponding to a point that is near, but not directly on, the underwater structure. For example, the temperature measurement can be made from a point that is immediately above or in front of a selected control point 1104 or 1404. Several hundreds or thousands of measurements can then be made in sequence to obtain an average ratio of the strengths of the different wavelengths or polarizations to obtain an average that can be used to determine a temperature of the underwater structure 204 in an area adjacent the point from which the measurements are made. For example, and as can be appreciated by one of skill in the art after consideration of the present disclosure, the temperature of the underwater structure 204 can be calculated from the temperature of the water as determined by operation of the temperature subsystem 702 of the monitoring system 304, and from the temperature of the water immediately adjacent the monitoring system 304, as determined from a direct temperature sensor provided as part of a CTD device 642 connected to or included as part of the monitoring system 304.

Leak detection can also be performed as part of the example use scenario. Specifically, point cloud data from the water over or adjacent an underwater structure 204 can include return intensity information that differs from that of undisturbed water or from the underwater structure 204 itself. In particular, the return from undisturbed water will have a relatively lower intensity and the underwater structure 204 itself will have a relatively higher intensity than a plume of fluid or bubbles formed as a result of a leak. The intensity data can be analyzed, for example by comparing returns from points within a selected volume of water surrounding a portion of an underwater structure 204 containing a fluid, to determine whether a plume of escaping fluid is present.

The methods and systems described herein can enable monitoring the movement and displacement of underwater structures 204 over time, including X, Y, Z movement and angular tilts; vortex induced vibration monitoring; movement of the subsea tree; water hammer kick detection during drilling and production operations; kick detection caused by rapid flow rate changes of production fluids or hydrocarbons during drilling and production operations; top hat structure rotational alignment monitoring; subsidence relative to monuments or other structures and vertical well or tree growth; and monitoring and validation of paddle or valve positions, and gauge positions. Vibration monitoring using embodiments of the present disclosure can be performed in connection with subsea pipes, pumps, or other components from one or more static or moving monitoring systems 304. In addition, measurements from multiple locations along an underwater structure 204 can be used to make the vibration mode measurements. Leak detection using embodiments of the present disclosure can include the detection of hydrocarbons, drilling fluids and other fluids, such as glycol and hydraulic fluids, used to operate and test subsea infrastructure. Volume or surface change measurements of underwater structures 204 or the seabed can also be performed using embodiments of the present disclosure. These measurements can include anode volume calculations and comparisons over a time period for indication of external and internal corrosion, and for determining the remaining useful life of anodes. Seabed volume measurements can be made for drill cuttings, scour, and/or subsidence. Reservoir over pressure from well injection and stimulation can be detected using embodiments of the present disclosure by monitoring the seafloor for cracks or deformations, as well as seepage from methane gas bubbles and other hydrocarbons. This phenomenon is depicted in FIG. 19, which depicts gas bubbles seeping from a crack in the seafloor along with seafloor deformation. The temperature of different underwater structures 204 can also be taken using embodiments of the present disclosure by measuring the temperature of water surrounding the underwater structure 204.

Various measurements enabled by embodiments of the present disclosure are made possible by the unique, staring nature of the monitoring system 304 in at least some operating modes. For instance, by taking a series of range measurements along a line over a period of time as part of detecting and measuring vibration, a monitoring system 304 as described herein can also detect transient events, such as kick or hammer events. The acquisition of a series of range measurements from multiple points also enables the detection of a vibration mode in an underwater structure 204. Temperature measurements and leak detection monitoring are facilitated by obtaining a series of returns from areas around an underwater structure 204. In addition, by obtaining and storing accurate location information regarding multiple control points, detection of valve or other configurable component positions, and rotation of components is possible.

Figure 20:
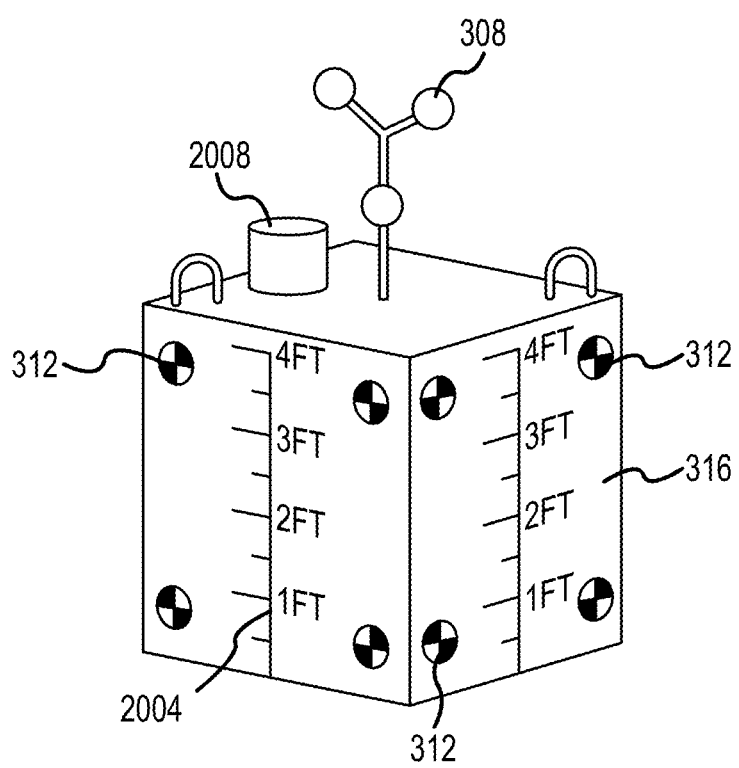
FIG. 20 depicts a structure in accordance with embodiments of the present disclosure for subsidence and movement detection.

FIG. 20 depicts a monument 316 that can be used in connection with the monitoring of an underwater structure 204 in accordance with embodiments of the present disclosure. The monument 316 features three-dimensional 308 and/or two-dimensional 312 targets. In accordance with further embodiments, the monument 316 can include additional indicia, such as scales 2004. Such indicia can assist in determining visually whether the monument 316 itself or the surrounding seafloor or structure 204 has moved. A monument 316 can also provide a reference point with respect to which the relative location of an underwater structure 204 and/or the monitoring system 304 itself can be determined and monitored. In accordance with still further embodiments of the present disclosure, the monument 316 can include an acoustic compatt 2008 to enable the acoustic validation of the location of the monument 316. The acoustic compatt 2008 therefore allows for an independent validation measurement using a different measurement mechanism (acoustic versus optical). Accordingly, one or more monuments 316 can be positioned within a scene to provide fixed reference points that can be accurately identified by the monitoring system 304 and that can be used as reference points to determine movement of underwater structures 204 relative to the monuments 316.

As can be appreciated by one of skill in the art after consideration of the present disclosure, a monitoring system 304 as described herein enables the acquisition of various parameters concerning underwater structures 204 remotely, from some nonzero standoff distance, without requiring physical contact with such structures, and without requiring integrating or retrofitting sensors that must be mounted to the underwater structure 204. Embodiments of a monitoring system 204 are particularly advantageous because they provide for non-touch measurements, reduced tooling requirements, improved accuracy, and improved flexibility.

The parameters that can be monitored by a monitoring system 304 as disclosed herein can include the actual location and disposition of a structure 204, whether the structure 204 has moved, whether the structure 204 is vibrating, the temperature of the water immediately surrounding the structure 204, and whether a fluid is leaking from the structure 204. In addition, embodiments of the present disclosure provide a monitoring system 304 and methods that permit the simultaneous or near simultaneous acquisition of data regarding such parameters. For example, the acquisition of a set of range information along a line described by a particular azimuth angle and elevation angle can be used to detect vibration within a structure 204 intersected by that line, and an average of that range information can also be used to determine the location of that structure 204 at a control point 1104 or 1404 located on that structure 204. In addition, the monitoring system 304 can be controlled to obtain sets of range measurements from multiple locations (e.g. control points 1104 or 1404) along a structure 204 in fast succession in virtually the same time, which can be used to calculate the vibration mode of the structure 204. As another example, a return received at the monitoring system 304 from an azimuth angle, elevation angle, and range corresponding to a location immediately adjacent an underwater structure 204 can be simultaneously provided to a primary receiver, and used in connection with leak detection, and to first 756 and second 760 temperature channel receivers and used in connection with measuring the temperature of the water at that location. Accordingly, a single monitoring system 304 placed and operated in the vicinity of an underwater structure 204 can provide monitoring and metrology with respect to multiple underwater structures 204, without requiring contact with those structures 204.

As described herein, a monitoring system 304 can be implemented as a single spot sensor system, such as a scanning lidar, or a lidar that receives and senses returns from multiple points within a scene in simultaneously. In a monitoring system 304 implemented as a single spot sensor system, measurements from different points within a scene can be made at virtually the same time, by sequentially pointing the lidar device 600 of the monitoring system 304 at different points within the scene in an automated fashion. In a monitoring system 304 implemented as a flash sensor system, measurements from different points within a scene can be made at the same time (i.e. multiple measurements can be obtained from returns generated from a single pulse of light 704), with returns received at different pixels within the sensor corresponding to different azimuth angles and elevation angles relative to the monitoring system 304. The monitoring system 304 can be mounted on an ROV, AUV, tripod, monument, cage, or other subsea structure. In at least some embodiments, a cage or frame 624 to which a monitoring system 304 is mounted can itself comprise an underwater structure, and can provide a platform with numerous selectable functions. This can include the incorporation of batteries and a power control system that allows for long-term autonomous deployment. The monitoring system 304 can also provide additional capabilities, including, but not limited to, data storage and backup, temperature sensors, depth sensors, salinity sensors, other chemical sensors, and communication devices. The monitoring system 304 can also provide timing signals between multiple sensors to time synchronize the data collection of those sensors. Examples of communication devices include wired electrical or optical systems, a radio frequency, free space optical, or acoustic devices. Communications can be with ROV's, AUVs, resident vehicles, other intelligent structures in the field, or the surface. The monitoring system 304 can store data, compress and send out data samples, or auto process data to look for change detection and send alarms signals when change is detected. Moreover, a monitoring system 304 can provide power, data storage, and communications capabilities to other monitoring devices or monitoring systems 304, for example to allow for monitoring at different angles or over an increased field of view. Alternatively or in addition, the monitoring system 304 can be connected to the local infrastructure for power and/or communications.

In accordance with still other embodiments of the present disclosure, a 3-D point cloud comprising data obtained by a monitoring system 304 can encompass portions of an underwater scene that include multiple underwater structures 204, monuments 316, additional monitoring systems 304, three-dimensional targets 308, two dimensional targets 312, and other structures or features within a field of regard 328 of the monitoring system 304. The relative locations of such features can be used in connection with detecting the movements of the features relative to one another. Moreover, by incorporating monuments 316, three-dimensional targets 308, two-dimensional targets 312, and control points 1104 and 1404 that have known locations relative to an absolute reference system, tracking the relative locations of underwater structures 204 can be performed by different monitoring systems 304, or by monitoring systems 304 that have themselves been repositioned between different point cloud data acquisition sessions or during point cloud acquisition sessions.

In at least some embodiments of the present disclosure, a human operator or user interacts with the monitoring system 304 through a monitoring and control station 804 that is in operative communication with the monitoring system 304. The user can control the field of regard 328 of the monitoring system 304 by entering control commands through a user input 816 to direct a movable platform or vehicle 324 carrying the monitoring system 304, and/or to direct a pan and tilt head 604 to which a lidar device 600 or the monitoring system 304 itself is mounted. In addition, real time or near real-time feedback regarding the field of regard 328 of the monitoring system 304 can be provided to the user through the user output 820. Moreover, the feedback provided by the user output 820 can be in the form of a two-dimensional image obtained by a camera 636, a visualization of point cloud data obtained by a lidar devices 600, or a synthesis of two-dimensional and three-dimensional data.

In accordance with still other embodiments of the present disclosure, a monitoring system 304 can operate autonomously or semi-autonomously. For example, in an autonomous mode, the monitoring system 304 can scan a scene to obtain point cloud data, and can execute software to detect and identify an underwater structure 204 of interest. The monitoring system 304 can further identify control points on the structure 204, and can obtain data relative to those control points. Examples of such control points include particular features on the underwater structure 204, three-dimensional 308 and two dimensional 312 targets, points taken at intervals along the underwater structure 204, or the like. In a semi-autonomous mode, a user can provide direction to the monitoring system 304, such as defining the limits of a scene or features within a scene comprising an underwater structure 204 for which monitoring is to be performed. Alternatively or in addition, a user can define a feature on a structure 204, such as a surface, to be monitored, and the monitoring system 304 can define control points within the surface for use in connection with the monitoring. As yet another example, a user can manually identify features or targets 308 or 312, for example by controlling a cursor presented in association with a visualization of point cloud data, and the monitoring system 304 can precisely define the location of the selected control point 1104 or 1404 by identifying the center or centroid of the target 308 or 312, the edge of a feature, or other distinguishing indicia or feature at or near the user selected location.

As can also be appreciated by one of skill in the art after consideration of the present disclosure, various functions can be distributed amongst different components of a monitoring system 304 or different connected systems or devices. For example, the processor 748 located within an underwater pressure vessel 700 of a monitoring system 304 can execute application software 763 that controls an associated lidar device 600 to obtain raw point cloud data comprising azimuth angle, elevation angle, range, intensity, and timestamp information. The information generated by such onboard processing can then be transmitted by the communications interface 768 to a monitoring and control station 804. Alternatively or in addition, onboard processing performed by the monitoring system 304 can provide automatic notifications or alarms that are transmitted to the monitoring and control station 804 or other facility. The monitoring and control station 804 receives the point cloud data, notifications, alarms, or other information transmitted by the monitoring system 304 through a communication interface 828, and stores the point cloud data 840 in data storage 824. The processor 808 can then execute system application software 832 to present a visualization of the point cloud data through a user output device 820. The processor 808 can further execute system application software 832 to compare point cloud data obtained at different times for the detection of movement, vibration, or leaks. Moreover, point cloud data can be averaged by operation of the processor 808, to provide more accurate location and temperature information. In accordance with still other embodiments of the present disclosure, such postprocessing of point cloud data can be performed by the monitoring system 304 itself, by servers or control stations provided in place of or in addition to the monitoring and control station 804, or in various combinations.

Embodiments of the present disclosure provide systems and methods that enable a single instrument (i.e. a lidar device 600 provided as part of a monitoring system 304) to obtain information regarding multiple parameters concerning an underwater structure 204. Accordingly, the difficulties associated with coordinating and calibrating multiple instruments to make such multiple measurements, as may have been done previously, are avoided. Embodiments of the present disclosure further provide a unique interface (or application programming interface (API)), for example as provided through execution of application software 763 and/or 832, to perform the multiple measurements using the single instrument. In a general operating mode, an initial scan of a scene is taken that is quickly processed and displayed to a user through a display screen provided as part of a user output device 820. The initial image can then be used to identify target areas of interest. The initial image can be created using three-dimensional point cloud data or two-dimensional data. Moreover, the two-dimensional data can be derived from three-dimensional data obtained by a lidar device 600, or from a two-dimensional camera 636. In either case, the azimuth and elevation angles at a recorded time are known for each point and can be used to revisit those exact locations on the target or underwater structure 204, for example to confirm that the associated underwater structure 204 has not moved, to detect vibration, and to take temperature measurements relative to known locations. In addition, control points 1104 or 1404 that correspond to targets 308 or 312, or particular structural features, and the spatial relationship between the targets 308 or 312 and particular features, are recorded and can be used in connection with detecting movement of the underwater structure. In at least some embodiments, the user can select an area or areas within the image by banding or by identifying multiple points on the image. The user can then specify what operations are to be performed upon the selected area. These operations can include some or all of the following: high-resolution scanning, including locating the underwater structure 204 or features thereof in three-dimensional space; vibration measurements; temperature measurements; and leak detection. The monitoring system 304 can then be operated to automatically make the measurements within or, for temperature and leak detection purposes, within the vicinity of the specified area.

In accordance with at least some embodiments of the present disclosure, the technology encompasses:

(1) A method for monitoring an underwater structure, comprising:

taking a first three-dimensional scan of an underwater scene using a first monitoring system, wherein a first set of point cloud data is produced from the first three-dimensional scan, wherein locations of at least some points on the underwater structure are included in the first set of point cloud data;

identifying a first control point on the underwater structure to be monitored, wherein the first control point has a first three-dimensional location that corresponds to a first point included in the first set of point cloud data;

a first selected period of time after taking the first three-dimensional scan, using the first monitoring system to obtain a second three-dimensional location of the first control point on the underwater structure; and comparing the first three-dimensional location to the second three-dimensional location to determine whether the underwater structure has moved.

(2) The method of (1), wherein the three-dimensional locations comprise azimuth angle, elevation angle, intensity, and range measurements (3) The method of (2), wherein making the measurements includes at least one of measuring a voltage, a time, a frequency, a phase, a number of samples, a number of digits, a pixel count, or a fringe count.

(4) The method of (2) or (3), wherein the measurements are made by at least one of laser scanning, ladar, flash ladar, laser triangulation, photometric stereo, stereoscopic vision, structured light, photoclinometry, stereo-photoclinometry, holographic systems, amplitude modulated continuous wave (AMCW) phase detection, chirped AMCW, amplitude frequency modulated continuous wave (FMCW) detection, true FMCW, pulse modulation codes, time of flight pulse detection.

(5) The method of (2) to (4), wherein the measurements are made by at least one of a scanning system device or a multi-detector device or 2-D or 3-D camera in which each detector pixel equates to an angle.

(6) The method of any of (1) to (5), further comprising:
taking a first series of range measurements from the first monitoring system along a first line corresponding to a first azimuth angle and a first elevation angle, wherein the first line intersects the underwater structure;
comparing a plurality of the range measurements within the first series of range measurements to determine whether the underwater structure is vibrating.

(7) The method of (6), further comprising:
determining an amplitude and a frequency of vibration of the underwater structure at the intersection of the first line and the underwater structure.

(8) The method of (6) or (7), further comprising:
taking a second series of range measurements from the first monitoring system along a second line corresponding to a second azimuth angle and a second elevation angle, wherein the second line is not parallel to the first line, and wherein the second line intersects the underwater structure;
determining an amplitude and a frequency of vibration to the underwater structure at the intersection of the second line and the underwater structure.

(9) The method of (8), further comprising:
determining a mode of vibration of the underwater structure.

(10) The method of any of (1) to (9), further comprising:
receiving a first series of return signals from a first point located in water surrounding the underwater structure, wherein the first point is located along a second azimuth angle, a second elevation angle, and at a second range relative to the first monitoring system, and wherein the first point is not located on the underwater structure;

for each of the return signals in the first series of return signals, determining a ratio of a first component of the return signal to a second component of the return signal;

determining a temperature of the water at the first point from a plurality of the determined ratios.

(11) The method of (10), wherein for each of the return signals in the first series of return signals the first component includes light of a first wavelength and the second component includes light of a second wavelength.

(12) The method of (10), wherein for each of the return signals in the first series of return signals the first component includes light of a first polarization and the second component includes light of a second polarization.

(13) The method of any of (10) to (12), wherein at least one of temperature and salinity measurements from a point sensor are used to calibrate the temperature measurement made from the plurality of the determined ratios.

(14) The method of (13), wherein the temperature measurement from the point sensor are compared to a temperature measurement made from a plurality of determined ratios obtained at a range gate that is closest to the point sensor and away from the range gate of the structure of interest.

(15) The method of any of (10) to (14), wherein determining a ratio of a first component of the return signal to a second component of the return signal includes providing the first component of the return signal to a first temperature channel receiver and providing the second component of the return signal to a second temperature channel receiver, the method further comprising:

for each of the return signals in the first series of return signals, providing a portion of the return signal to a primary receiver.

(16) The method of any of (1) to (15), further comprising:

determining from a plurality of series of return signals from a plurality of points located in the water surrounding the underwater structure a fluid is leaking from the underwater structure.

(17) The method of (16), wherein the fluid is at least one of liquid hydrocarbons, gas hydrocarbons, drilling fluid, glycol, hydraulic fluid, or other fluids used to operate and test subsea infrastructure, wherein the leak monitoring is performed during pre-commissioning pressure tests, other tests, or normal operations.

(18) The method of (16) or (17), wherein leak monitoring is performed for reservoir over pressure from well injection and stimulation by monitoring for seepage from methane gas bubbles and other hydrocarbons.

(19) The method of any of (1) to (18), wherein the first control point corresponds to a centroid of a feature of the underwater structure.

(20) The method of any of (1) to (18), wherein the first control point corresponds to a target placed on the underwater structure.

(21) The method of any of (1) to (20), wherein the first and second three-dimensional locations of the first control point on the underwater structure is a location of a centroid of the control point.

(22) The method of any of (1) to (21), further comprising:

identifying a second control point in the underwater scene, wherein the first three-dimensional location of the first control point has a first location relative to the second control point, wherein the second three-dimensional location of the first control point has a second location relative to the second control point; and generating an indication that the underwater structure has moved when the first location relative to the second control point is different than the second location relative to the second control point.

(23) The method of (22), wherein the indicated movement includes at least one of the following:

movement and displacement of the underwater structure, including movement in X, Y, Z planes and angular tilt;

vortex induced vibration;

movement of a subsea tree;

displacement caused by water hammer events during drilling and production;

kick events caused by rapid flow rate changes or production fluids or hydrocarbons during drilling and production;

top hat structure rotational alignment changes;

subsidence relative to monuments, other structures, seabed artifacts, and vertical well or tree growth;

paddle position movement;

valve position movement; and gauge position.

(24) The method of any of (1) to (22), wherein a volume or surface of an underwater structure is monitored over time using a plurality of series of return signals from a plurality of points located in the scene to detect change, wherein the measurements include measurements of at least one of: anode volume for indications of corrosion; seabed volume measurement for drill cutting, scour, or subsidence; and seabed cracks or deformations due to reservoir over pressure from well injection and stimulation.

In accordance with further aspects of the present disclosure, the technology encompasses:

(25) A method of monitoring an underwater structure, comprising:

a light source and a receiver of a monitoring system along a first line having a first azimuth angle and a first elevation angle relative to the monitoring system, wherein the first intersects the underwater structure at least at a first point in time;

taking a first series of range measurements along the first line;

comparing a first one of the range measurements included in the first series of range measurements to a second one of the range measurements in the first series of range measurements; and outputting an indication of a status of the underwater structure.

(26) The method of (25), wherein the first series of range measurements are taken in series, the method further comprising:

deriving a first frequency of vibration from the first series of range measurements, wherein an indication that the underwater structure is vibrating is output.

(27) The method of (25) or (26), further comprising:

directing the light source and the receiver of the monitoring system along a second line having a second azimuth angle and a second elevation angle relative to the monitoring system;

taking a second series of range measurements along the second line;

comparing a first one of the range measurements included in the second series of range measurements to a second one of the range measurements included in the second series of range measurements;

deriving a second frequency of vibration from the second series of range measurements; and deriving a vibration mode of the underwater structure from the first and second series of range measurements.

(28) The method of any of (25) to (27), further comprising:

directing the light source and the receiver of the monitoring system along a second line having a second azimuth angle and a second elevation angle relative to the monitoring system;

receiving a series of return signals from a point along the second line and at a selected range from the monitoring system, wherein the point is located in water surrounding the underwater structure;

determining a temperature of the water at the point;

outputting an indication of the temperature of the underwater structure.

In accordance with still other aspects of the present disclosure, the technology encompasses:

(29) A system for detecting movement of an underwater structure, comprising:

a monitoring system, including:

a receive telescope;

a first beam splitter, wherein the first beam splitter is located along a first optical path defined by the receive telescope, and wherein the first beam splitter defines a range return signal optical path and a temperature return optical path;

a primary receiver, wherein the primary receiver is located along the range return signal optical path;

a second beam splitter, wherein the first beam splitter is located along the range return signal optical path, and wherein the second beam splitter defines a first temperature channel optical path and a second temperature channel optical path;

a first temperature channel receiver, wherein the first temperature channel receiver is located along the first temperature channel optical path;

a second temperature channel receiver, wherein the second temperature channel receiver is located along the second temperature channel optical path.

(30) The system of (29), further comprising:

a user interface system, including:

a user input;

a user output;

memory;

a communication interface;

a processor, wherein the user interface system processor is operable to execute application software stored in the user interface system memory to present a visualization of point cloud data obtained by the laser monitoring system through the user output, and to receive input from the user through the user input, wherein the input includes a selection of a control point;

wherein the monitoring system further includes:

a light source;

a processor;

memory;

a communication interface, wherein the monitoring system processor is operable to execute application software stored in the monitoring system memory to operate the light source and the primary receiver to obtain three-dimensional location data, including three-dimensional location data of the underwater structure, and wherein the monitoring system processor is operable to execute application software stored in the monitoring system memory to operate the light source and the first and second temperature channel receivers to obtain temperature data from water at a selected range from the monitoring system.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A system, comprising:

a light source;

a receiver;

a processor; and memory, wherein the processor is operable to execute application software stored in the memory to:

operate the light source and the receiver to obtain first point cloud data from an underwater scene;

operate the light source and the receiver to obtain second point cloud data from the underwater scene; and compare a location in three-dimensional space of a first control point on an underwater structure in the underwater scene in the first point cloud data to a location in three-dimensional space of the first control point on the underwater structure in the underwater scene in the second point cloud data to measure movement of the first control point on a structure within the underwater scene; determine a vibration of a structure within the underwater scene; determine a status of a structure within the underwater scene; or measure a displacement of a structure within the underwater scene.

2. The system of claim 1, wherein the system includes a lidar device.

3. The system of claim 1, wherein the system operates to measure movement of the first control point on a structure within the underwater scene.

4. The system of claim 1, wherein the first control point is a target that has a fixed location on the underwater structure.

5. The system of claim 3, wherein the structure is a manmade structure.

6. The system of claim 3, wherein the structure is a natural structure.

7. The system of claim 1, wherein the system operates to measure a temperature of the structure within the underwater scene.

8. The system of claim 7, wherein the structure is a manmade structure.

9. The system of claim 7, wherein the structure is a natural structure.

10. The system of claim 7, wherein the receiver includes a primary receiver, a first temperature channel receiver; and a second temperature channel receiver.

11. The system of claim 10, wherein system further includes:

a receive telescope;

a primary beamsplitter; and a secondary beamsplitter, wherein the primary beamsplitter directs a first portion of light collected by the receive telescope to the primary receiver, wherein the primary beamsplitter directs a second portion of the light collected by the receive telescope to the secondary beamsplitter, wherein the secondary beamsplitter directs a first portion of the light received from the primary beamsplitter to the first temperature channel receiver, and wherein the secondary beamsplitter directs a second portion of the light received from the primary beamsplitter to the second temperature channel receiver.

12. The system of claim 11, wherein the light directed to the first temperature channel receiver has a first characteristic, and wherein light directed to the second temperature channel receiver has a second characteristic.

13. The system of claim 12, wherein the first characteristic is a first polarization, and wherein the second characteristic is a second polarization.

14. The system of claim 12, wherein the first characteristic is a first wavelength, and wherein the second characteristic is a second wavelength.

15. The system of claim 1, wherein the system operates to determine a vibration mode of the structure within the underwater scene.

16. The system of claim 1, wherein the system operates to determine a status of the structure within the underwater scene.

17. The system of claim 16, wherein the status of the structure within the underwater scene includes whether a fluid is leaking from the structure.

18. The system of claim 1, wherein the system operates to measure a displacement of the structure within the underwater scene.

19. The system of claim 18, wherein the structure is a portion of a seafloor.

20. The system of claim 1, wherein the first point cloud data is obtained while the system is at a first location, and wherein the second point cloud data is obtained while the system is at a second location.

21. The system of claim 1, wherein the first point cloud data is obtained while the system is at a first location and the light source is pointed along a first line of sight, and wherein the second point cloud data is obtained while the system is at the first location and the light source is pointed along a second line of sight.

22. The system of claim 1, wherein the processor is further operable to execute the application software stored in memory to compare a location of a second control point on the underwater structure in the underwater scene in the first point cloud data to a location of the second control point on the underwater structure in the underwater scene in the second point cloud data to measure movement of the structure, and wherein the second control point corresponds to a unique feature on the underwater structure.

* * * * *